(12) United States Patent
Kernahan et al.

(10) Patent No.: US 7,543,163 B2
(45) Date of Patent: Jun. 2, 2009

(54) LOW POWER METHOD OF MONITORING AND OF RESPONSIVELY INITIATING HIGHER POWERED INTELLIGENT RESPONSE TO DETECTED CHANGE OF CONDITION

(75) Inventors: Kent Kernahan, Cupertino, CA (US); John Carl Thomas, Sunnyvale, CA (US); Craig Norman Lambert, San Jose, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 11/326,104

(22) Filed: Jan. 4, 2006

(65) Prior Publication Data

US 2006/0176040 A1    Aug. 10, 2006

Related U.S. Application Data

(60) Provisional application No. 60/641,889, filed on Jan. 5, 2005.

(51) Int. Cl.
*G06F 1/00* (2006.01)
*G06F 1/26* (2006.01)
*G06F 1/32* (2006.01)
(52) U.S. Cl. .................. 713/300; 713/320; 713/322; 713/340
(58) Field of Classification Search .................. 713/300, 713/320, 322, 340
See application file for complete search history.

(56) References Cited

U.S. PATENT DOCUMENTS

| 3,719,943 | A | * | 3/1973 | Applegarth | 342/47 |
| 5,454,114 | A | * | 9/1995 | Yach et al. | 713/330 |
| 5,461,266 | A | * | 10/1995 | Koreeda et al. | 307/125 |
| 5,721,482 | A | * | 2/1998 | Benvegar et al. | 320/106 |
| 5,822,600 | A | * | 10/1998 | Hallowell et al. | 713/340 |
| 6,314,522 | B1 | * | 11/2001 | Chu et al. | 713/322 |
| 6,504,442 | B2 | * | 1/2003 | Jordan et al. | 331/173 |
| 6,608,510 | B2 | * | 8/2003 | Yamawaki et al. | 327/156 |

* cited by examiner

*Primary Examiner*—Mark Connolly
(74) *Attorney, Agent, or Firm*—Michael W. Caldwell

(57) ABSTRACT

A synchronous control system includes a logic controller (e.g., microprocessor) which can be put into low power standby or sleep mode by shutting off its clock. A quick-start oscillator (QSO) remains shut off to conserve power when not needed, but awakens rapidly and supplies clock signals to the logic controller for quickly awakening the controller so the latter can to respond to exigent circumstances. One such circumstance can be the drop of a vital supply voltage below a predefined threshold. A low power comparator (LPTC) detects the drop and starts up the QSO which in turn awakens the controller. The controller determines what the reason for the awakening is, quickly responds to the exigent circumstance and then turns the QSO off to thereby conserve power and put itself (QSO) back to sleep. Disclosures are provided for the QSO and a first calibration subsystem used to maintain QSO output frequency within a desired range. Disclosures are provided for the LPTC and a second calibration subsystem used to set its trigger threshold. Disclosure of a novel DAC within the LPTC is also provided.

30 Claims, 15 Drawing Sheets

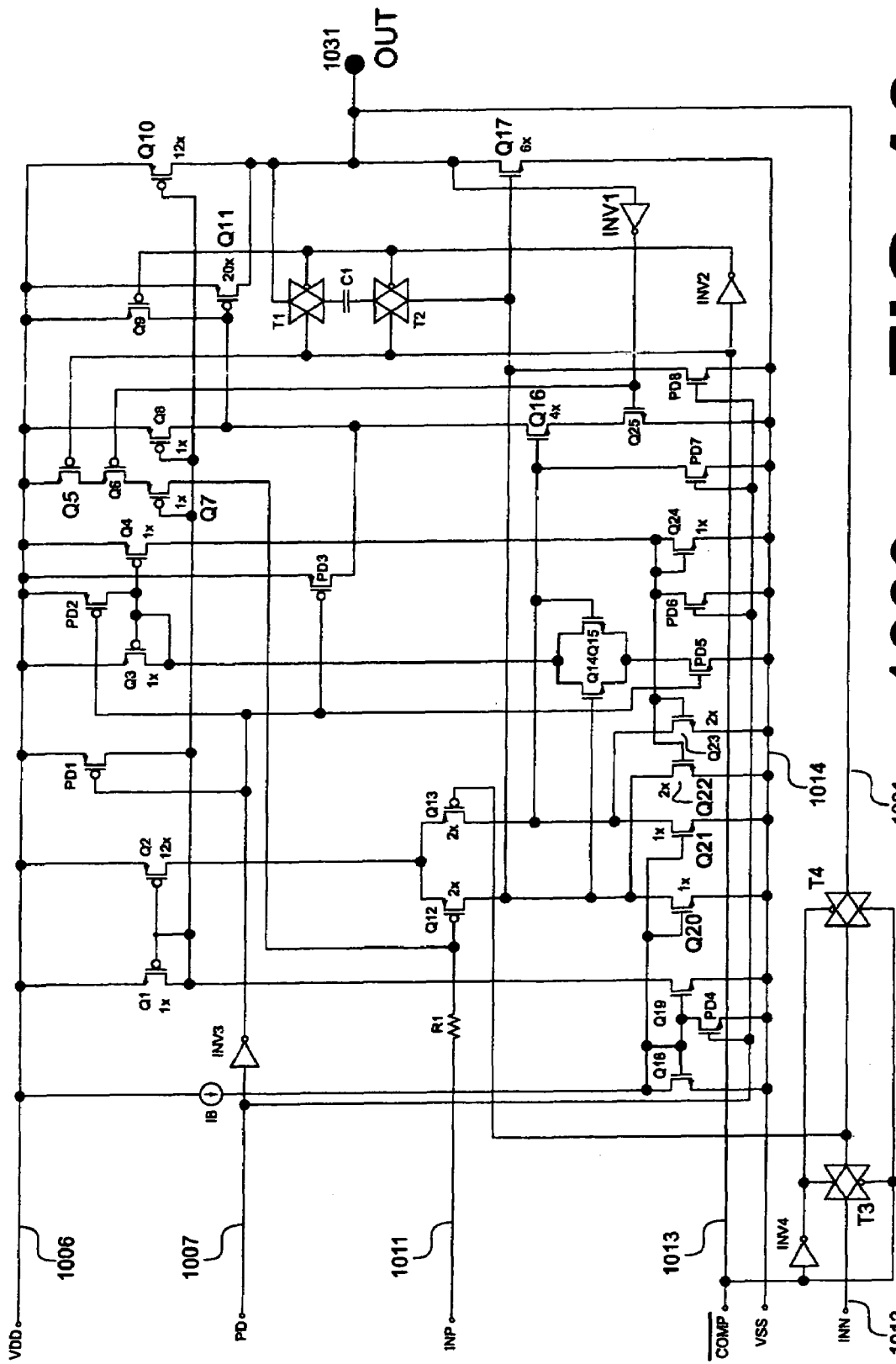

LOW POWER METHOD OF MONITORING AND OF RESPONSIVELY INITIATING HIGHER POWERED INTELLIGENT RESPONSE TO DETECTED CHANGE OF CONDITION

CLAIM OF BENEFIT

The present application is a continuation-in-part (CIP) of below cited, Ser. No. 60/641,889 and claims benefit thereof to the extent permitted by law.

FIELD OF DISCLOSURE

The present disclosure of invention relates generally to situations where it may be advantageous to provide low power monitoring of a condition followed by slightly-higher powered, rapid and intelligent logical response to detected change of the condition. A nonlimiting example is the maintaining of a battery-powered or like powered system in a low power sleep state interrupted by occasional awakenings and responses to exigent circumstances. More specifically, one embodiment relates to a system monitoring means that itself normally remains in a low power or half-asleep state while monitoring a vital aspect of the rest of the more asleep system. The normally, half-asleep monitoring means temporarily switches into a higher power, more alert state in response to an emergent one or more conditions (i.e., imminent loss of minimum memory-maintenance voltage) that may call for energetic responding thereto.

CROSS REFERENCE TO CO-OWNED APPLICATIONS

The following copending U.S. provisional or regular patent applications are owned by the owner of the present application, and their disclosures are incorporated herein by reference:

(A) Ser. No. 60/641,889 filed Jan. 5, 2005 by Kent Kernahan et al and originally entitled, LOW VOLTAGE DETECTOR AND QUICK START OSCILLATOR FOR LOW QUIESCENT POWER OPERATION;

(B) Ser. No. 11/030,688 filed Jan. 5, 2005 by Milton D. Ribeiro and Kent Kernahan and originally entitled, Switching Power Converter Employing Pulse Frequency Modulation Control;

CROSS REFERENCE TO PATENTS

The disclosures of the following U.S. patents are incorporated herein by reference:

(A) U.S. Pat. No. 6,825,644 issued Nov. 30, 2004 to Kent Kernahan and John Carl Thomas and entitled "Switching Power Converter".

COPYRIGHT NOTICE

A portion of the disclosure of this disclosure contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

DESCRIPTION OF RELATED ART

It is well known that clock-driven CMOS logic can be kept in a low power state if its main driving clock is shut off. It is also known that the power consumed by such Complementary Metal Oxide Semiconductor (CMOS) logic or the like tends to increase as its clocking frequency increases. On the other hand, it is understood that the speed at which clock-driven sequential CMOS logic or the like can respond to emergency situations tends to slow as its clocking frequency is slowed. Thus, in situations where it is desirable to have both low power consumption and fast, logical response by a sequential logic means to exigent circumstances, these two characteristics of CMOS logic (or its equivalents) conflict with one another.

A nonlimiting example of such a situation may be found in the art of battery powered systems and the like (i.e., systems driven by low power photovoltaic panels). These are sometimes operated in a low power or sleep mode for extended periods of time in order to conserve on power draw when not needed, so as to thus extend the useful duration of charge storage within a battery system or another charge storing system. In the sleep mode, part or essentially all of system activity is disabled. Some portions of the system (e.g., volatile CMOS memory) may need to be maintained above a predetermined minimum sleep voltage, $V_{SLEEPmin}$, so that vital operational data stored therein is not lost and/or so that the system may remain sufficiently alive to be able to respond to new inputs as they sporadically present themselves, especially those that threaten continued viability of the system.

In some situations it is desirable for the mostly-asleep system to be able to quickly wake up in part or in whole and to quickly respond to newly emerging situations as appropriate. One situation that may call for rapid response is imminent loss of the minimum sleep voltage, $V_{SLEEPmin}$, as applied to essential memory; this for example being caused by parasitic loss of charge in the system-preserving, minimal power supply means due to passage to time and/or other causes (i.e., temperature change). In some systems, a voltage slightly above the minimum sleep voltage, $V_{SLEEPmin}$ is stored within a low-leakage capacitor (a system-preserving, minimal power supply means) with the main chemical or other battery being effectively disconnected from major loads so as to better extend battery life. Eventually, charge leaks out from even the low-leakage capacitor and it becomes necessary to temporarily recouple the main battery directly or indirectly (i.e., through a switched regulator) to the minimized load and capacitor so as to recharge the capacitor (or other system-preserving, minimal power supply means) back to $V_{SLEEPmin}$ or above (e.g., to a predetermined, deadband high voltage, $V_{dbh}$ such as disclosed in above cited, U.S. Ser. No. 11/030, 688). In one subset of such systems, the low-leakage capacitor is recharged by application of a single recharge pulse to slightly above $V_{SLEEPmin}$ (e.g., to 10% above) and then allowed to decay back down to $V_{SLEEPmin}$ before the next recharge is applied. Other means for recharging the discharged capacitor may be used besides effective reconnection of the main battery, including for example, temporary connection to a power grid or to a photovoltaic panel. The battery is just an illustrative example.

One problem with such mostly-asleep systems is that upon awakening, the system may not have adequate knowledge of the state of its surroundings and that state could be rapidly deteriorating or otherwise changing. So a rapid attaining of situational awareness may be needed and a rapid response thereto may also be needed. By way of example, if one or both of a combination of battery and photovoltaic power is to be used for recharging a charge-maintaining capacitor during an arbitrary awakening time, the system may need to intelligently decide which source to use and also what duration of recharge pulse might be needed. That could depend on whether awakening occurs during night or day, and if the latter, whether it is sunny or cloudy at the time. Duration of the recharge pulse may also depend on the state of the main battery, which itself may have been subject to voltage decay due to passage of time and/or due to temperature change. The awakening system should be able to quickly assess its situation and make an intelligent decision of what to do next. But how can it do so if its main clock is turned off to save energy? On the other hand, if the main drive clock is left always on, how can the mostly asleep system keep its power draw low while asleep?

From the above, it can be seen that there is need for a low power means of maintaining situational awareness. There is need for a monitoring means that can detect changed condition such as when a voltage across a sleep mode voltage source (e.g., the low-leakage capacitor) is dropping perilously close to (or below) a predefined minimum sleep voltage, $V_{SLEEPmin}$. The monitoring means should be able to quickly indicate that corrective action needs to be taken once an alert-worthy condition is detected. In order to preserve power, however, the monitoring means and its method of monitoring should themselves be relatively low powered ones. On the other hand, in order to provide quick alert when an alert-worthy condition is detected, the monitoring means and its method of alerting should be of relatively high speed.

From the above, it can be further seen that, for a sleeping and exigently-awakened system, it is desirable to not only have a low power monitoring means but to also have an intelligent response means (e.g., logic means) that is rapidly and properly clocked so it can respond quickly and correctly to each alerted situation. Conventional practice uses PLL's (phase locked loops) for precision control of the main clock drives of microprocessors and like controller logic. Such PLL's generally have slow reaction time and may take on the order of many milliseconds to lock onto a desired clocking frequency in view of external temperature and/or voltage conditions. Such start up delays may be unacceptable in emergency wake-up situations such as described above.

SUMMARY

An embodiment in accordance with the invention includes a low-power threshold-cross detecting comparator (LPTC) and a quick-start oscillator (QSO) coupled to be awakened by the LPTC. The QSO quickly switches from a low power, non-oscillating mode to a mode where it is oscillating at or substantially close to a desired target frequency when the QSO is awakened and activated by the LPTC after the latter comparator detects a response-worthy event such as that a monitored analog voltage is unidirectionally crossing below a predetermined other voltage; e.g., a minimum sleep voltage, $V_{SLEEPmin}$. The low-power comparator (LPTC) draws little or no power when it is half-asleep, but quickly attains an ability to be more energetic in alerting an outside means (e.g., the QSO) as it responds to an alert-worthy condition, such as a unidirectional crossing of a monitored voltage below a programmably defined threshold. After it has performed its alert-generating mission, the LPTC may be left in monitoring mode or placed in a power down (PD) mode to preserve system power. (If there are multiple LPTC's, they may all be placed in PD mode after the QSO starts up and activates a controlling logic means, this being done to preserve system power while the QSO and controlling logic means are running.) The quick-start oscillator (QSO) draws little or no power when it is asleep, but quickly attains a predefined, proper operating frequency when awakened so that the further, controlling logic circuitry within the awakening system may be quickly and properly clocked (but not overclocked, that is, clocked too fast) by the awakened QSO and the logic circuitry then goes on to perform one or more desired response operations (e.g., temporarily activating a battery powered switched power supply) in response to the emergent situation detected by the LPTC (low power monitoring means). After the awakened logic circuitry has performed its assigned mission, the QSO may be returned to a halted mode to thereby put the logic circuitry and itself to sleep and thus preserve system power. While the illustrated example is directed to low-power detection of a voltage that drops below a threshold, it is within the contemplation of the disclosure to detect other forms of anomaly while in low power mode, such as when one voltage becomes substantially greater than another even if both are constantly changing, or when a monitored voltage crosses out of a predefined range and/or such as when a monitored temperature crosses out of a predefined range.

One particular embodiment disclosed herein includes an asymmetrically responsive, Low-power Programmable Threshold-crossing Comparator (LPTC) that provides a relatively fast response to detection of a drop of a given, first voltage (received at an INN node) relative to a supplied threshold (the drop of INN relative to the threshold being one that indicates a loss of memory-sustaining charge for example). The LPTC provides a relatively slower response to detection of an opposed situation where the monitored first voltage increases above the threshold voltage level. The LPTC thus draws less power when responding to a changed condition in that opposed and uninteresting situation. In one embodiment, the LPTC includes a low-power digital-to-analog converter (DAC) that is programmable to supply an appropriate analog reference voltage (to an INP node of the LPTC). In one embodiment, the low-power DAC is calibratable while in-system so that an accurate decision can be made as to whether the monitored voltage (INN) is falling dangerously close to, or below a defined reference voltage value.

One embodiment includes a quick start oscillator (QSO) that incorporates a quickly stabilizing core oscillator circuit for generating a clock signal of desired high frequency relative to a low frequency reference, where the high frequency (e.g., about 62 MHz in one embodiment) is a large multiple (e.g., >about 100 times) of the low reference frequency (e.g., about 33 kHz) but does not exceed a predefined upper limit (e.g., about 66 MHz in one embodiment which is the maximum safe clocking speed for an associated microprocessor chip). In one embodiment, a quickly awakenable, voltage controlled oscillator (a-VCO) is provided. The a-VCO is coupled to a VCO controller so that the output frequency of the oscillator (a-VCO) can be periodically or otherwise calibrated prior to the occurrence of an emergency awakening event, this calibration being conducted relative to a substantially lower frequency of a crystal time base or other such means whose frequency is substantially immune to temperature, voltage and/or other changes. The crystal time base draws relatively little power because of its relatively low frequency (e.g., 33 KHz). In one embodiment, the much higher frequency (e.g., 62 MHz) of the a-VCO is controlled by adjusting a control voltage applied to the a-VCO by use of a DAC and a stored digital control word (QDIN). Once the proper digital control word (QDIN) is determined for given conditions and stored, the a-VCO may be quickly started to operate at or substantially near the target frequency as long as surrounding conditions (e.g., temperature) do not change substantially.

In one embodiment, the VCO controller which drives the DAC and its digital control word storage (QDIN register)

includes two ripple-counters and an update means for updating the digital control word in the storage based on a count made by one of the two counters. One of the two ripple-counters counts from rising-edge to rising-edge of the crystal time base clock (low power clock) while the other counts from falling-edge to falling-edge. Either of the counters maybe used to determine how many, high frequency VCO output ticks are filling up the time span (the period) between the crystal time base clock edges. The count(s) is/are compared to a desired target count and the control voltage applied to the VCO is incremented or decremented so as to move the VCO output count towards agreement with the count desired. In one embodiment, an indication is given of when the awakened a-VCO has settled into a steady-state, stable awakened mode (GOOD mode) relative to the current digital control word (QDIN). This indication may be used to gate clock usage (clock enable) by external logic. In one embodiment, an indication is given of when the awakened a-VCO is having its frequency-control word changed and restored (UPDATE). In one embodiment, the awakened QSO is locked into continuing to to oscillate at the desired high frequency (target frequency) until an intelligent supervisory means (i.e., a microprocessor) instructs the QSO to return to its low power shut off mode and instructs the low power monitor (LPTC) to resume its low-power monitoring mode. In some embodiments, even after the QSO has been awakened, the low power monitor (LPTC) is kept powered up rather than being powered down and a stay-on signal is ORred into the QSO circuit to keep it oscillating even if the LPTC that awakened the QSO switches its alert signal back to unasserted (e.g., low). While the QSO is in its low power sleep mode, the digital control word which has been developed via calibration to represent the most recently established VCO control voltage (established via repeated re-calibration) is retained, and this retained value can become the starting value applied to the control DAC of the VCO the next time the QSO is quickly started up and/or re-calibrated. Thus, upon awakening, the QSO is able to start up in a condition at or very close to the desired target frequency attained the last time it was calibrated provided factors such as temperature have not changed substantially. In one embodiment, a post-awakening steady-state stability of the QSO is deemed to have been attained after a predefined number of cycles of the QSO are counted (e.g., 8 clock cycles of the fast VCO output).

Other aspects of the disclosure will become apparent from the below detailed description.

BRIEF DESCRIPTION OF THE DRAWINGS

The below detailed description section makes reference to the accompanying drawings, in which:

FIG. 10 is a schematic diagram of a low power programmable threshold comparator (LPTC) in accordance with the invention;

FIG. 13 is a schematic diagram of a power supply system having a low power sleep capability in accordance with the invention; and.

DETAILED DESCRIPTION

Figure 13:
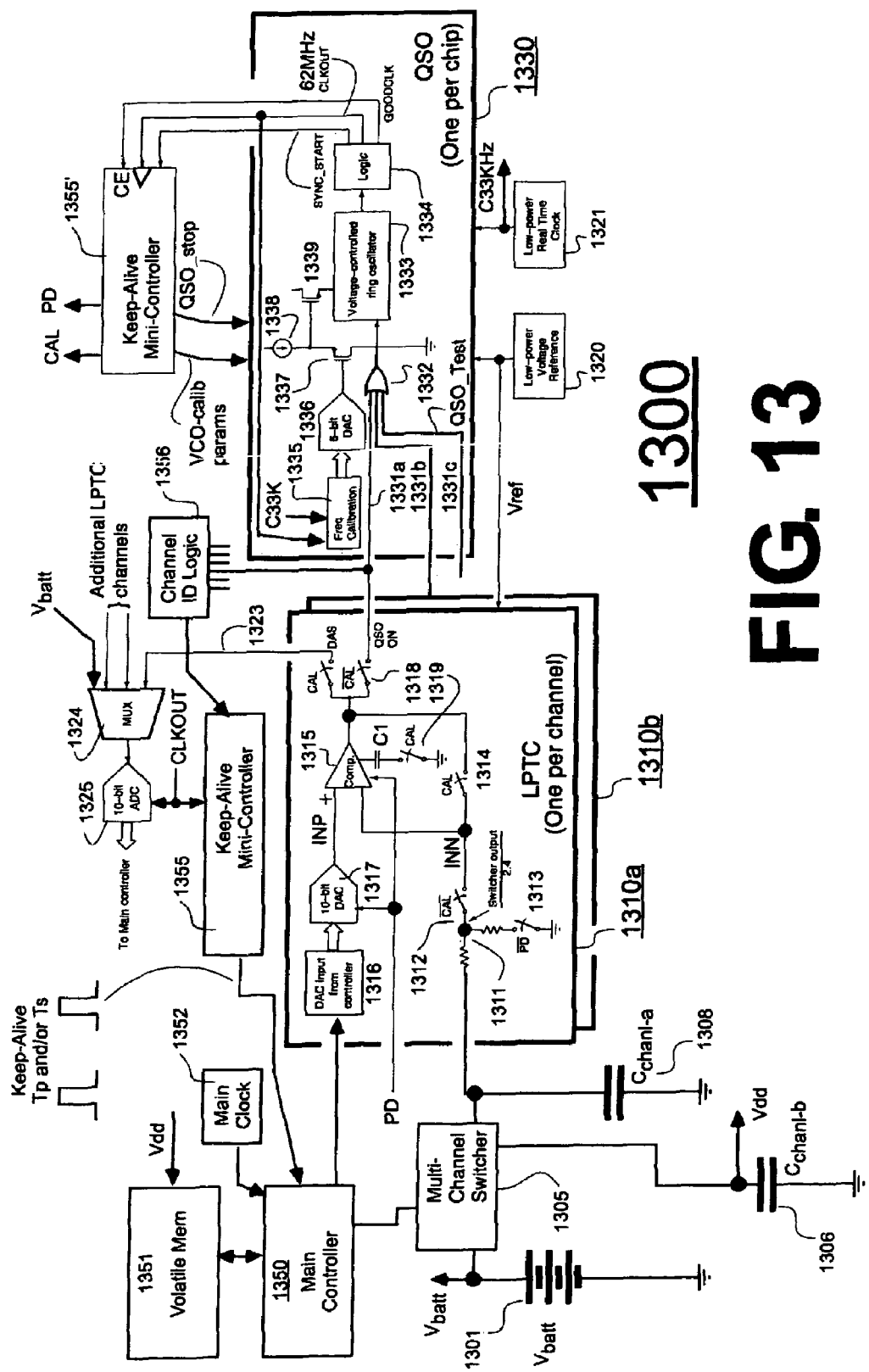

Referring to FIG. 13, a block diagram is provided of an illustrative system 1300 in accordance with the invention. While system 1300 sports a battery-powered, switched power supply (1301, 1305) having a low power sleep mode capability, the disclosure is not limited to just this illustrated application. The present teachings can find use in many other environments where it may be advantageous to provide one or both of a low power monitoring of vital system conditions and a higher powered, rapid intelligent or logical response to detected change of one or more of the monitored conditions.

Three components of particular relevance in FIG. 13 are: (1) a plurality of low-power-consuming, condition monitors (1310a, 1310b, etc., only two shown) that respectively monitor vital conditions (e.g., voltages) within the system 1300; (2) at least one quick-start oscillator (QSO) 1330 that can have its oscillations quickly started (e.g., in much less than a millisecond) by any one of the plural monitors 1310a-etc. coupled to that QSO; and (3) an intelligent digital mini-controller 1355-1355' that is awakened and brought into clock-driven action by the awakening of the at least one QSO 1330. (Incidentally, while mini-controller 1355-1355' is drawn as two boxes for easing illustration clutter, it is understood to represent one unit).

The switched power supply portion of the illustrative application comprises a battery 1301 or other power source (or connection thereto) for driving a digitally-controlled switching regulator 1305. In the example, regulator 1305 is a multi-channel one, meaning that it has two or more DC power outputs such as represented by a channel-"a", first low-leakage capacitor 1308 and a channel-"b", second low-leakage capacitor 1306. The switching regulator 1305 can be put into a low power sleep mode where, in effect, the main battery (or other like source) 1301 is decoupled from driving various major loads so as to thereby extend battery life. The high-drainage loads (not shown) are of course, also effectively decoupled from the illustrated voltage-sustaining capacitors, 1306, 1308 and/or switched into high resistance mode. The main battery 1301 may continue however to supply power directly or indirectly to minor loads such as a low power real time clock 1321 that is further described below. Since the main battery 1301 is effectively decoupled from supplying power to various major loads within the system, the low-leakage capacitors 1306, 1308, etc. are made primarily responsible for maintaining vital system voltages (or currents) at various system vital locations (e.g., memory 1351) so that the vital voltages (or currents) generally remain above respective predefined minimums. The low-power-consuming, condition monitors (1310*a*, 1310*b*, etc.) are made responsible for verifying that the vital voltages (or currents) are above the specified minimums, and if not, the condition monitors issue alerts indicating that the desired conditions are not being maintained. The intelligent mini-controller 1355-1355' is awakened and brought into action by the issued alerts and subsequent start-up of the QSO 1330. The mini-controller then tries to assess the surrounding situation at the time of awakening and to take corrective action as may be appropriate.

Before the main battery 1301 is decoupled from major loads (or vise versa, or loads are switched to high resistance mode) and before the system 1300 transitions into its low power sleep mode, a main controller 1350 of the switching regulator 1305 is put to sleep by shutting off its main drive clock 1352. In the illustrated embodiment, the main controller 1350 is larger and/or more complex and/or normally draws more power than the minicontroller 1355-1355'. The main drive clock 1352 of the main controller is designed to run slightly faster (e.g., 66 MHz versus 62 MHz) than the QSO in this embodiment, where this slightly faster frequency is relatively close to, but below a specified maximum safe-clocking frequency of the system. Other predefined relationships between the frequencies of a main drive clock and of the QSO may be provided for in other embodiments as may be appropriate. The reason that the QSO is configured to run slightly slower (at about 62 MHz) than the frequency of the main drive clock 1352 (about 66 MHz) in this embodiment is because the QSO-driven minicontroller 1355-1355' shares use (overlappingly but at different times) of some of the hardware and/or software resources (e.g., 1305) that are at other times driven by the main drive clock 1352. It is desirable in this particular environment to assure that the QSO does not operate faster than the main drive clock 1352 but at the same time does not operate much slower. This slightly less than relationship ($f_{QSO} < f_{Main}$) between the frequencies assures that the QSO does not induce logic race problems within the shared hardware and/or software. It also assures that the QSO-driven minicontroller 1355-1355' will complete its assigned task in essentially as little time as possible without inducing logic race problems.

Since the overall main controller 1350 consumes more power and most of its resources are not needed during sleep mode, it is undesirable during the sleep mode of system 1300 to awaken the more-power hungry, main controller 1350 (including starting up its main clock drive 1352) since this will draw unneeded power and also because it may take an excessively long time (e.g., more than a millisecond) to start up and calibrate the main clock drive 1352 (a PLL based drive) relative to a much lower frequency reference clock (C33KHZ). Instead, in most instances, only the quick-start oscillator (QSO) 1330 and the smaller minicontroller 1355-

1355' and shared parts of system resources are awakened for managing sleep-sustaining tasks while the system is in sleep mode.

One of the sleep-sustaining tasks is to assure that system-preserving voltages are maintained. Such system-preserving voltages (e.g., Vdd) may be provided to various points within the system and the electrical charge for such voltages may be stored in low-leakage capacitor means such as capacitors 1306 and 1308. In one embodiment, essentially all of the digital logic circuitry in system 1300 is implemented with CMOS technology integrally formed in one or a few monolithic integrated circuits so that such digital logic circuitry will draw a relatively minimal amount of power when not being actively clocked or otherwise agitated and so that process-matched transistors are formed where appropriate. In one embodiment, the main controller 1350 has a volatile memory means 1351 (e.g., CMOS static or dynamic memory) for receiving and storing operational data just prior to the system entering its sleep mode. When awakened at the end of a system sleep mode, the main clock 1352 will have its internal phase-locked loop (PLL) brought up to speed (e.g., 66 MHz) and then the main controller 1350 will access the operational data stored in the memory means 1351 and it will use that pre-stored operational data for continuing normal system operations. If the operational data is lost, the main controller 1350 will not be able to perform a routine wake up. Some form of time-consuming recovery may be necessitated. As such major loads (not shown) of the regulator may not be able to receive regulated power as quickly as desired when the overall system 1300 awakens out of sleep mode. It is therefore important to assure that the main system memory means 1351 does not lose its operational data. Accordingly, it is important for a data-maintaining voltage to be assuredly supplied on a continuous basis to the memory means 1351, even when the main controller 1350 is in sleep mode. One of the low leakage capacitors may be made responsible for storing the data-maintaining voltage of the main memory means 1351. The same or another low leakage capacitor may be made responsible for storing a data-maintaining voltage used by other memory means (i.e., 1316) distributively provided within the below-described LPTC's 1310 and/or QSO 1330. Separate power rails may be provided for analog and digital circuit if desired, so as to shield the analog circuitry from digital switching noise.

Connected to each channel capacitor is a respective, low-power-drawing, digitally-programmable but analog operating, comparator such as the illustrated LPTC's 1310*a* and 1310*b*. Only one is shown in greater detail at 1310*a* for servicing the "a" channel. LPTC 1310*b* is understood to be similarly structured but operatively coupled for monitoring the Vdd voltage on the channel-"b" capacitor 1306 and programmed for tripping at the appropriate minimum voltage for channel-"b". The plural LPTC's (i.e., 1310*a*) couple via binary logic activation lines like 1331*a*, 1331*b*, etc. to an OR gate 1332 for issuing alert signals to the QSO 1330 via that OR gate. The OR gate 1332 drives a quickly-awakenable VCO 1333 which voltage-controlled oscillator 1333 forms part of the already-mentioned quick-start oscillator (QSO) 1330. QSO 1330 may be used to supply clock pulses to mini-controller 1355-1355' after the QSO has been awakened by an alert signal issued by one of the change-of-condition monitors 1310*a*, 1310*b*, etc. In one embodiment, a GOOD-CLK control line of the QSO couples to a clock enable (CE) terminal of the mini-controller. The GOODCLK control line is driven low until the output frequency of the QSO is determined to be in a safe range and then GOODCLK is switched high, this preventing the mini-controller from being overclocked by a too fast of an output frequency.

When the mini-controller 1355-1355' is awakened by receipt of good CLOCK_OUT pulses from the QSO 1330, in one embodiment the mini-controller 1355-1355' tests a channel-identifying decoder 1356 to determine which, if any, channel issued the alert, and/or for what reason and the mini-controller then intelligently responds accordingly. In one embodiment, OR gate 1332 has at least one QSO_Test starting terminal 1331c for test starting the QSO (or starting it for reasons other than the tripping of an LPTC). The test start 1331c can be used to verify that the QSO 1330 and mini-controller 1355-1355' are in good operational order. The test start 1331c can be used to occasionally run the QSO through a self-calibration operation such as at predetermined times of the day or night. If upon awakening, the intelligent logic unit (e.g., minicontroller 1355) determines that no LPTC issued the QSO starting alert, the intelligent unit can assume that the QSO_Test starting terminal 1331c was used for test starting the QSO and it can respond according to programming for such testing or other use.

One alert-worthy condition is that of a low-leakage capacitor (1306 or 1308) having its voltage drop below a respectively defined minimum level. Another is that of battery 1310 having its voltage ($V_{batt}$) drop below a respectively defined minimum. Yet another can be that of a temperature sensor (not shown) with voltage output indicating that temperature in a given part of the system is drifting out of a predefined acceptable range. Many other alert-worthy conditions (e.g., change of pressure) can be similarly used to trigger an awakening of the QSO and/or the minicontroller. When a corresponding QSO-start signal (1331a, 1331b, etc.) is received from the appropriate LPTC, the channel ID logic 1356 indicates the channel number of the alert-issuing LPTC to the mini-controller 1355-1355'. After being awakened by the quickly-started QSO, the mini-controller 1355 determines if one of the low-leakage capacitors (1306, 1308) needs to receive a keep-alive recharge pulse, and if so, what the waveform and/or intensity of that pulse should be in view of surrounding circumstances (i.e., in view of current $V_{batt}$ voltage and/or current temperature). In generating the appropriate keep-alive recharge pulse, the mini-controller 1355 may make use of a subset of hardware and/or software resources (e.g., 1305) normally used by the main controller. After the keep-alive recharge pulse is delivered to the respective capacitor (1306, 1308, etc.), the mini-controller 1355-1355' can reset the alert-generating LPTC back into monitoring mode (if it had been taken out of monitoring mode in the interim) and the mini-controller can then put itself to sleep by issuing a QSO_Stop signal to the QSO 1330, thereby shutting off oscillations of the QSO and reducing power consumption within the system 1300.

While not explicitly shown in FIG. 13, in one embodiment the mini-controller can have access to other QSO controls such as Reset and/or Update_Periodicity control (not shown) and/or Update_Duration control (not shown—collectively, VCO calib parameters) for respectively and selectively resetting the QSO and preventing self-calibration updates from occurring within the QSO too often or for too short of a duration. Normally the QSO will be periodically awakend by itself and kept running for a short while (e.g., one period of the C33KHz slow clock described below) so that the QSO can perform a self update operation on itself to keep up with changing environmental conditions (e.g., changed temperature and/or supply voltage). However, if the QSO has not been run for awhile, it may be desirable to keep it running for plural periods of the slow clock so it can better calibrate itself. Depending on predictability of the environment, it may be desirable to increase the time span between self-updates so as to preserve system power or to decrease that time span so as to improve accuracy of output frequency if the environment appears to be a rapidly changing one. In some embodiments it can be empirically determined that the QSO reached substantially close to its target oscillation frequency (i.e., plus or minus one count off) within a measurable span of the real time clock (1321) and after that real time has elapsed, continued calibration updates to the QSO frequency may do more harm than good as the updates merely jitter the frequency by alternate plus and minus one counts rather than changing it significantly and they consume power in trying to keep the output frequency exactly on target. Accordingly, in such embodiments the mini-controller may be programmed to adjust the Update_Periodicity control value (not shown) as may be deemed appropriate. In one embodiment, the QSO includes logic for keeping the QSO running at least through two edges of a reference clock (e.g., CK33 clock) so that a measurement can be taken as to how many ticks of a QSO output signal (C62K) fit between the at least two edges of the reference clock signal.

In contrast to the Update_Periodicity control or other lines between the minicontroller and the QSO (lines that are not shown), the real time clock block 1321 may have an Update_Start line (not shown) which operatively couples to the QSO for occasionally causing the QSO to run without starting up the minicontroller, where in such an Update_Start situation the QSO runs for at least a time duration extending between 2 edges (e.g., 2 rising edges) of the low frequency reference clock (C33K, described below) so that a control word of reduced error can be occasionally recorded for the VCO 1333 even if the minicontroller has not been awakened by one of the LPTC's. In some embodiments, it can be days or weeks before sufficient charge depletes from the low leakage capacitors (1306, 1308) to trigger one of the LPTC's into awakening the minicontroller 1355. During that time, temperature or other conditions that could affect the VCO may have changed substantially. In order to keep up with such potential condition changes, the real time clock 1321 may be programmed to switch the QSO on for either a single or plural periods (e.g., about 1 to 5 periods) of the low frequency reference clock (C33K) perhaps once, twice or a few times each day so that the VCO calibration circuit has a chance to recalibrate itself. Alternatively or additionally, the minicontroller may be programmed to keep the QSO running for at least about 1 to 5 periods of the low frequency reference clock (C33K) every so often even if the minicontroller does need that much time to complete its alert-servicing task. Alternatively or additionally, a temperature monitoring circuit may be used to switch the QSO on for plural periods (e.g., about 2 to 5 periods) of the low frequency reference clock (C33K) each time a relatively large temperature drift (e.g., ±10° C.) is detected relative to that of the last update time. Time between recalibrations and length of each recalibration run can vary from application to application. Time between LPTC alert triggers can also vary from application to application. In some circumstances it may be desirable to perform a recalibration of the QSO's control word (QDIN) as a continued part of an LPTC-triggered response (especially if intelligent response to the LPTC-trigger consumes almost a full period of the low frequency reference clock (C33K)). In some circumstances it may be desirable to perform a recalibration of the QSO's control word (QDIN) as an independently triggered operation (especially if intelligent response to the LPTC-trigger consumes much less than a full period of the low frequency reference clock (C33K)).

The system's keep-alive mini-controller 1355-1355' is smaller in size and less complex than the main system controller 1350, thus requiring less operating power when awakened. If the main system controller 1350 is awake, it receives high accuracy and higher frequency main clock signals from a main clocking system 1352. On the other hand, the keep-alive mini-controller 1355-1355' may be operated for a substantially shorter time by the specially-generated, CLKOUT clocking signal produced by the QSO (1330) and only for the duration needed for handling a power-recharge operation or other such exigent circumstance. In one embodiment, while the mini-controller 1355-1355' is being temporarily-clocked by the CLKOUT clocking signal, the mini-controller 1355-1355' activates a set of power switches (shared resources, not explicitly shown) within the multi-channel switcher 1305 so as to temporarily apply one or more reenergizing pulses to a selected one or more of the discharging capacitors (1306, 1308) so as to keep the respective one or more channels above their respective, programmably-definable, $V_{SLEEPmin}$ levels. The activated set of power switches may be ones that are normally driven by the main controller 1350 when the latter is not in sleep mode. In one embodiment, such as that conforming to the above cited U.S. Ser. No. 11/030,688; the keep-alive mini-controller 1355-1355' issues a first pulse of duration Tp to a current sourcing, first power MOSFET (not shown) within the multi-channel switcher 1305 and a second pulse of duration Ts to a current sinking, second power MOSFET (not shown, also within unit 1305) so as to temporarily energize a corresponding LC tank circuit (of which only capacitor 1306 or 1308 is shown) and thereby raise the discharged capacitor to the desired voltage state. The Tp and Ts pulse duration values may be determined in many ways including by real time calculation or a table lookup that is responsive to an analog-to-digital conversion measurement (carried out by ADC 1325) of the $V_{batt}$ voltage then present at battery 1301 and/or in response to other environmental variables such as current temperature, and current time of day (provided by the 33 KHz real time, always-on clock module 1321). As already explained, the present invention is not limited to any specific LC tank circuit implementation or to their use in power supplies and may be practiced with other forms of capacitor recharging circuits and/or with other types of circumstances that call for low-power monitoring and quick, intelligent response (e.g., clocked response) to exigent circumstances.

Inside the illustrated LPTC 1310 there is provided a pre-calibrated voltage divider 1311 for driving one input (INN) of a uni-directionally high slew comparator 1315. The LPTC 1310 further includes threshold-storing register 1316 and a register-driven DAC (10 bit digital to analog converter) 1317. The analog output voltage generated by DAC 1317 drives a second input (INP) of the comparator 1315. During a calibration mode (CAL=1), main controller 1350 is turned on for storing an appropriate, threshold-setting value in register 1316. During the calibration mode (CAL=1), switch 1314 is closed to put comparator 1315 into a unity follower mode while switch 1312 is opened. Switch 1319 is closed to thereby insert a oscillation-inhibiting capacitor C1 into the circuitry of the comparator 1315. Switch 1318 is set to route the output of comparator 1315 via line 1323 to a 10-bit ADC (analog to digital converter) 1325 via an analog Mux 1324. The high-precision ADC 1325 measures the routed signal and feeds the digitized result back to the main controller 1350. Using this feedback path, the main controller 1350 adjusts the value stored in register 1316 until a desired measurement value is attained in view of changing temperature and/or other environmental variables and also in view of any inherent offset or other errors that the comparator 1315 and/or DAC 1317 may exhibit. The INP threshold value presented to the comparator 1315 is calibrated by this awake-mode mechanism so as to counter-compensate for such variables. After the main controller 1350 is put to sleep, register 1316 retains the last calibration value stored into it.

In another embodiment (not shown), the minicontroller 1355 has shared access to register 1316 and the signal, CAL and the output of ADC 1325 so that the minicontroller 1355 can occasionally recalibrate the contents of register 1316 in a similar manner even when the main controller 1350 is asleep. Any of various scheduling schemes can be used for initiating recalibration of the register 1316 contents by the minicontroller 1355 including, but not limited to: recalibrating every Nth awakening event (where N can be, say, 5 or greater and each such awakening event is LPTC triggered) and/or recalibrating every Mth hour (where M can be, say, 4 or greater and each such awakening event is triggered by the real time clock 1321 starting up the QSO via test lead 1331c or otherwise. Items 1321, 1331c are described in more detail below).

In one set of embodiments, aside from shared use of ADC 1325 and/or one or more of the plural threshold registers 1316 (there can be one per LPTC), the minicontroller 1355 further shares use with the main controller 1350 of at least the power switch resources in switcher 1305 and of the real time clock 1321. During the asleep-and-awakened-by-an-alert mode, multiplexer 1324 may be commanded by the alert-awakened minicontroller 1355 (where the main one 1350 remains asleep) to route the $V_{batt}$ power supply voltage to ADC 1325 so that the minicontroller can receive a $V_{batt}$ measurement reading from the ADC 1325 for use in determining the duration of pulses Tp and Ts that are to be applied within switcher 1305. In one embodiment, the ADC 1325 is a synchronously operated ADC and the CLKOUT clock signal couples to the ADC 1325 during the awakened minicontroller states so that the ADC 1325 may be synchronously controlled by the minicontroller.

During the asleep-and-monitoring mode, switches 1314 and 1319 are open. Switches 1312 and 1313 are closed. Switch 1318 is set to route the output of comparator 1315 via line 1331a to OR gate 1332. The QSO 1330 is initially asleep during asleep-and-monitoring mode, but is quickly awakened (e.g., in much less than one millisecond, and in one embodiment, within 8 cycles or less of VCO 1333) in response to one of the inputs of OR gate 1332 going high.

Inside QSO 1330, the output of OR gate 1332 is routed to a start-up point in voltage controlled ring oscillator 1333. A frequency-adjusting calibrator 1335 (with internal memory capability) compares the current output frequency against a defined target frequency and responsively establishes a VCO-driving control voltage by way of a stored digital control word that is applied to a 5-bit DAC 1336, where the latter drives voltage-shifting transistors 1337 and 1339. Item 1338 is a reference current source. Logic block 1334 determines when the quickly-started oscillations of VCO 1333 have stabilized so that it can issue a GOOD-CLOCK indicating signal to the other circuitry indicating that the CLKOUT clocking signal is now valid (fairly stabilized relative to a QDIN command signal issued by block 1335, see also block 320 of FIG. 2). In one embodiment, the mini-controller 1355-1355' has a clock enable terminal (CE) coupled to receive the GOOD-CLOCK indicating signal from the QSO, this preventing the minicontroller from undertaking any major operations before a safely usable clock frequency has been established. Upon operatively beginning to execute its major software routines in response to the good CLKOUT clocking signal, the mini-controller may make appropriate, intelligent decisions for how to temporarily repower the voltage-preserving capacitors, 1306, 1308. Of course for other identified alert situations (e.g., recalibrating of one or more of registers 1316), the awakened mini-controller 1355-1355' will make other appropriate decisions and/or perform other intelligent functions in response to detection of an alert-worthy condition by an alert generating device, where the latter device could be the real time clock 1321 or an LPTC that is monitoring a different kind of condition at one or more other nodes within the system 1300.

Frequency calibrating block 1335 uses a low-power, low frequency clock output signal (C33K) of the real-time clock 1321 as a reference for determining whether the VCO is operating at a desired, target frequency, which target in one embodiment is roughly 62 MHz, or roughly about 2000 times the frequency of the 32 KHz reference clock from block 1321. The calibrating block 1335 sends digital control commands through DAC 1336 and transistors 1337-1339 for keeping the drive voltage of VCO 1333 at a voltage appropriate for existing temperature or other conditions.

Referring to FIG. 10, one Low Power Programmable Threshold Comparator (LPTC) in accordance with the invention is illustrated in more detail. The LPTC monitors a voltage representative of a system-vital voltage, where the representative voltage is applied to the INN input node. In one embodiment, the representative voltage is equal to the system-vital voltage divided by 2.4 (Other, greater-than-unity divisors can be of course established by design of divider 1311.) The LPTC 1000 determines when the power-level representing voltage at the INN terminal decays below a programmably-defined reference voltage (applied to the INP input node). The illustrated LPTC has at least three modes of operation: (1) a comparator mode, for use as a voltage monitor; (2) a unity gain follower mode, for use in system calibration; and (3) a power-down mode. As already explained, the calibration mode executes when the main controller is setting a threshold establishing value in register 1316 of FIG. 13. Power-down mode (PD=1) may be asserted when the LPTC is not being used or PD=1 may be asserted by the minicontroller 1355 after the latter has awakened and taken charge of the situation, this including the minicontroller asserting a logic "1" to the QSO_Test terminal 1331c or to another such equivalent node within the QSO. In one embodiment, alert-producing LPTC or all LPTC's is/are shut off by the Power-down command to conserve on power consumption after the minicontroller or main controller awakens. If such powering-down via PD is used during sleep mode, the minicontroller will de-assert PD and bring desired ones of the LPTC's back into comparator modes (COMP=1) before the minicontroller puts itself back to sleep.

In FIG. 10, the terminal 1011 denoted as INP is also termed as a non-inverting input node and it may be used for receiving a supply-independent reference voltage. Terminal INN is also termed as the inverting input 1012 and it may be used for receiving a monitored representative (i.e., voltage divided version) of a given supply voltage. The given supply voltage and/or its monitored representative may vary from LPTC to LPTC of a multi-channel system. In one embodiment, the monitored representative is not to be allowed to fall substantially below the predetermined minimum sleep voltage, $V_{SLEEPmin}$, where the latter is digitally defined by a register and DAC combination such as 1316/1317 of FIG. 13. Terminal VDD (1006) functions as the input for positive supply voltage and terminal VSS (1014) functions as the ground return connection. The comparator's binary output decision appears on the terminal 1031 denoted as OUT.

To place the LPTC in the comparator mode (1), its terminal 1013 denoted COMP-bar is driven to logic low (at or close to Vss). This renders transmission gate T3 conductive, thus coupling INN to the gate of Q13. It also renders transmission gates T1, T2 and T4 nonconductive. In this comparator mode (1), the output of the LPTC 1000 can respond very rapidly if the monitored voltage (INN) falls below the preprogrammed threshold value (as defined by INP). In one embodiment, it may be assumed that INN>INP at start up of the comparator mode because the minicontroller saw to it. While in the comparator mode, the LPTC responds comparatively more slowly to an opposed change of inputs where the monitored voltage (INN) rises above the preprogrammed threshold value (INP). Thus the LPTC does not draw more power in response to an uninteresting change of condition such as when voltage at INN is becoming even greater than voltage at INP.

In the circuit, differentially-driven PMOS input transistors, $Q_{12}$ (driven by INP) and $Q_{13}$ (driven by INN) respectively operate to deliver respective currents to the drains of respective NMOS sink transistors $Q_{20}$ and $Q_{21}$ below them. Q2 sources the current from above. The sink transistors $Q_{20}$ and $Q_{21}$ are urged into a saturation part (high output impedance area) of their respective operating characteristics by use of a common-mode feedback mechanism. The common-mode feedback mechanism is realized with use of a second differential amplifier, ($Q_{14}$-$Q_{15}$) that responds to the average common-mode voltage present at the drains of PMOS transistors $Q_{12}$ and $Q_{13}$ of the input differential amplifier. Incidentally, in this description, the relative size or gate width of respective transistors (not to be confused with source to drain channel length) will be denoted by relative values where 1× is denoted as a standard design size and 2×, for example is denoted as a double size. If not specifically shown in FIG. 10, 1× sizing may be assumed. In one embodiment, the power-down (PD) transistors are slightly smaller than 1× size.

The common-mode feedback amplifier ($Q_{14}$-$Q_{15}$) operates as follows. NMOS transistors $Q_{14}$ and $Q_{15}$ draw a common current sourced from PMOS transistor $Q_3$. The magnitude of the common current passing through diode-connected transistor $Q_3$ is a function of the average of the gate-to-source voltages of $Q_{14}$ and $Q_{15}$. That common current is replicated (mirrored) in the series-connected combination of $Q_4$ (PMOS) and $Q_{24}$ (NMOS, 1×) thereby causing the mirror-driven, NMOS counterpart transistors $Q_{22}$ and $Q_{23}$ (counterparts of $Q_{24}$) to draw more current from the drains of the input differential pair $Q_{12}$ and $Q_{13}$ when the common-mode voltage of those drains rises. The same feedback loop causes the mirror-driven transistors $Q_{22}$ and $Q_{23}$ to draw less current when the common-mode voltage of the $Q_{12}$ and $Q_{13}$ drains falls. This negative feedback mechanism operates in parallel superposition with the DC load current drawn by the NMOS sink transistors $Q_{20}$ and $Q_{21}$ for the differential input stage $Q_{12}$-$Q_{13}$. The negative feedback mechanism functions to maintain the output common-mode voltage of the circuit slightly above the threshold voltage ($V_T$) of the NMOS transistors, as fabricated in the integrated circuit (IC), so that sink transistors $Q_{20}$ and $Q_{21}$ are kept turned on in their saturation regions for maintaining relatively high gain and low capacitance. This in turn speeds up the response time of the Low Power Programmable Threshold Comparator (LPTC) when in comparator mode.

PMOS transistor $Q_{10}$ forms a current-sourcing part of the output stage of the LPTC 1000. Transistor $Q_{10}$ (PMOS, 12×) supplies load current to the output node 1031 when $Q_{10}$ is turned on alone or together with PMOS $Q_{11}$ during switching. The gate of the output gain transistor $Q_{17}$ is coupled to the source of input transistor $Q_{12}$. Two large width transistors, PMOS $Q_{11}$ (20× standard width) and NMOS $Q_{16}$ (4× the standard width) are provided for increasing the slew rate of a downward threshold crossing detection (indicating INN is dropping perilously close to or below INP). The 4×-sized $Q_{16}$ is connected to the side of the output stage that does not directly drive current-sinking transistor $Q_{17}$. This is done for two reasons: (1) to provide balance to the input stage and (2) for improving detection slew rate in the output stage since the gate of $Q_{17}$ is not capacitively loaded by slew enhancing circuitry, $Q_{17}$ can be more quickly turned off at the same time that sourcing current is pumped into output node 1031 from $Q_{10}$ and $Q_{11}$.

A first input-unbalancing operation can be explained as follows. When INN is higher than INP, Q12 draws more of the current sourced from Q2 and in turn drives the gate of Q17 high so as to urge the level at the OUT node towards low.

A second input-unbalancing operation proceeds as follows. If the inverting input voltage (INN) begins to drop below the non-inverting input voltage (INP), P-transistor $Q_{13}$ becomes more conductive relative to its input stage counterpart, $Q_{12}$; and as a result the voltage at the gate of the 4×-sized $Q_{16}$ rises. The output voltage, OUT of the comparator is still relatively low at this time (below a threshold level of INV1) such that inverter INV1 drives a high voltage onto the gate of $Q_{25}$ (the NMOS in series with $Q_{16}$), this effectively connecting the source of $Q_{16}$ to the low rail, VSS. The drain of the now more-turned on $Q_{16}$ pulls down more current from current source Q8 (PMOS, 1×) thereby pulling the gate of $Q_{11}$ (PMOS, 20×) closer to VSS. The large overdrive and relatively large size (20×) of $Q_{11}$ cause it to source much more current into the OUT line than $Q_{10}$ (PMOS, 12×) could accomplish alone, thereby temporarily increasing the slew rate at which the OUT voltage will begin to switch toward high (logic 1) in response to INN falling relative to INP. The result is that the illustrated LPTC responds relatively rapidly to such a low-going input voltage change (i.e., inverting input voltage INN dropping below the non-inverting input voltage INP). The LPTC (FIG. 10) does not respond as quickly to a high-going input voltage change (with INN rising relative to INP) because output sink transistor $Q_{17}$ (NMOS, 6×) is not assisted by a secondary output sinker in the same way that output source transistor $Q_{10}$ (PMOS, 12×) is assisted by its secondary output sourcer $Q_{11}$ (PMOS, 20×).

The LPTC is designed to quickly reduce its current consumption after the comparator meta-level (threshold of INV1) has been crossed—given that a logic high at the OUT terminal typically indicates a low power condition when the LPTC is in comparator mode and given that it is desirable to conserve power once the meta-crossing level of the comparator has been crossed and the comparator OUT node is assuredly switching towards its logic high state. (It assuredly continues to switch towards high with immunity against input noise because of a built-in hysteresis mechanism as will be explained shortly.) The LPTC is designed so that the current-sourcing, slew-rate enhancement circuit (e.g., $Q_{11}$-$Q_{16}$) draws essentially no current while INN is substantially greater than INP. Extra power for quickened detection is consumed only during the first half of the rising edge of the positive going OUT pulse (before the halfway meta state of the output node is crossed) and then, after crossing of the meta state, power draw is conserved as output node continues to switch toward logic high after having crossed the logic threshold of inverter INV1. With regard to the LPTC reducing its current consumption after the comparator's meta-level has been crossed, when the voltage at the OUT terminal rises to be higher than the threshold voltage of inverter INV1 (in other words, when OUT is greater than about half of VDD in one embodiment), the lightly loaded inverter INV1 quickly switches its output to low and NMOS transistor $Q_{25}$ turns off in response. Since there is no longer a current drawing load for current source Q8, charge output by transistor Q8 pulls the gate of PMOS Q11 to VDD, thereby shutting down Q11 (20×) and minimizing the boost current consumption originally used by the LPTC as it began to quickly switch its OUT terminal toward logic high.

As indicated above, after the OUT voltage (node 1031) crosses up above its meta-level, a hysteresis mechanism operates to continue to urge the OUT voltage towards Vdd by distorting the input situation. Here is how it works. When the LPTC is in its normal, comparator operating mode, COMP-bar is set low, thereby turning on PMOS Q5 as part of a hysteresis enabling chain that includes Q6 and Q7. Q6 is activated by a low output of inverter INV1 (meaning OUT node 1031 has crossed up above its meta-level). Q7 can then operate as a current source for pumping current through R1 and thereby increasing the voltage present at the gate of input transistor Q12. In one embodiment, Q7 is biased to source about 200 nA through R1 and into the voltage source level provided at INP. The output impedance of the INP voltage source is made relatively low, so that its voltage is not perturbed by the sourced 200 nA. The Q7 sourced current raises the voltage at the gate of Q12, in this example by +10 mV (200 nA times the 50K ohms of R1), thereby providing a reasonable amount of hysteresis. The 10 mV gate boost helps to prevent chatter in the output (1031) of the comparator due to noise at the differential input. Such chatter is often seen in fast-response comparators that have slow changing, small voltage differences presented at their differential inputs. The magnitude of current sourced by Q7 is determined by mirror-coupling the gate of Q7 to the diode-connected gate of Q1. Q1 is itself mirror-coupled to IB1, a precision current source, by way of Q18-Q19.

Because of the voltage boost provided by Q7, when the Q5-Q6-Q7 current sourcing chain is enabled after the voltage at the OUT terminal has crossed above the threshold voltage of inverter INV1, not only is Q25 turned off for thereby shutting off the boost current of Q11, but PMOS Q6 is turned on so that Q7 can source its voltage boosting current through R1 thereby increasing the difference between the INN voltage and the voltage present at the gate of Q12. The effect of this hysteresis is to decrease the conductance of Q12 faster and force more current (from Q2) to instead flow differentially through Q13. The decreased conductance of Q12 allows for faster turn off of Q17 (with gate of latter discharging through Q20). This action urges the comparator to continue switching in the direction it started along, with Q17 shutting off and Q10 being turned on as a result of the output voltage (1031) having crossed above the threshold voltage of inverter INV1.

Unity gain follower mode of the LPTC is used during calibration, which relates to setting of threshold register 1316 as described above. For unity gain follower mode, COMP-bar is taken high (PD remains low) so as to thereby turn on transmission gates T1, T2 and T4 while turning off transmission gate T3. With transmission gate T4 now rendered conductive, the OUT node 1031 of the comparator couples to the inverting input defined by the gate of Q13. INP is now the variable input that is calibrated by adjusting the digital word stored in register 1316 (FIG. 13). Turned-on transmission gates T1, T2 place Miller capacitor C1 between the drain and gate of Q17 to thereby reduce the bandwidth of the otherwise fast comparator and to thereby reduce the chance of oscillation or noisy chatter during calibration. The value of Capacitor C1 should be selected sufficiently high so as to provide unity-gain stability. The output slew enhancement and hysteresis features of the normal comparator mode are turned off when in the unity gain follower mode. Q9 shuts off Q11 (20×)

when COMP-BAR is high and the output of INV2 is thus low. The high COMP-BAR level also shuts off Q5 thereby disabling hysteresis. The LPTC circuit then can function as a relatively symmetrical unity gain follower where the OUT voltage level is indicative of the INP voltage value.

During either of the normal comparator mode or the unity gain follower mode, the power-down terminal PD is held at logic low. In one embodiment, when services of the LPTC's OUT signal are no longer needed, such as after an alertable other circuit (e.g., the QSO and/or the minicontroller) has been awakened by the logic high state of the LPTC OUT terminal, the LPTC can be shut down to save on power draw. A logical high input placed on the PD input terminal turns on the following power-down transistors: PD1, PD2, PD3, PD4, PD5, PD6, PD7, and PD8 to place the comparator in its power down mode. For example, when activated, PD8 shuts off Q17 in the output stage. When activated, PD4 shuts off Q19 so that Q19 does not sink current. PD1 shuts off Q10 from sourcing current in the output stage.

Figure 11:
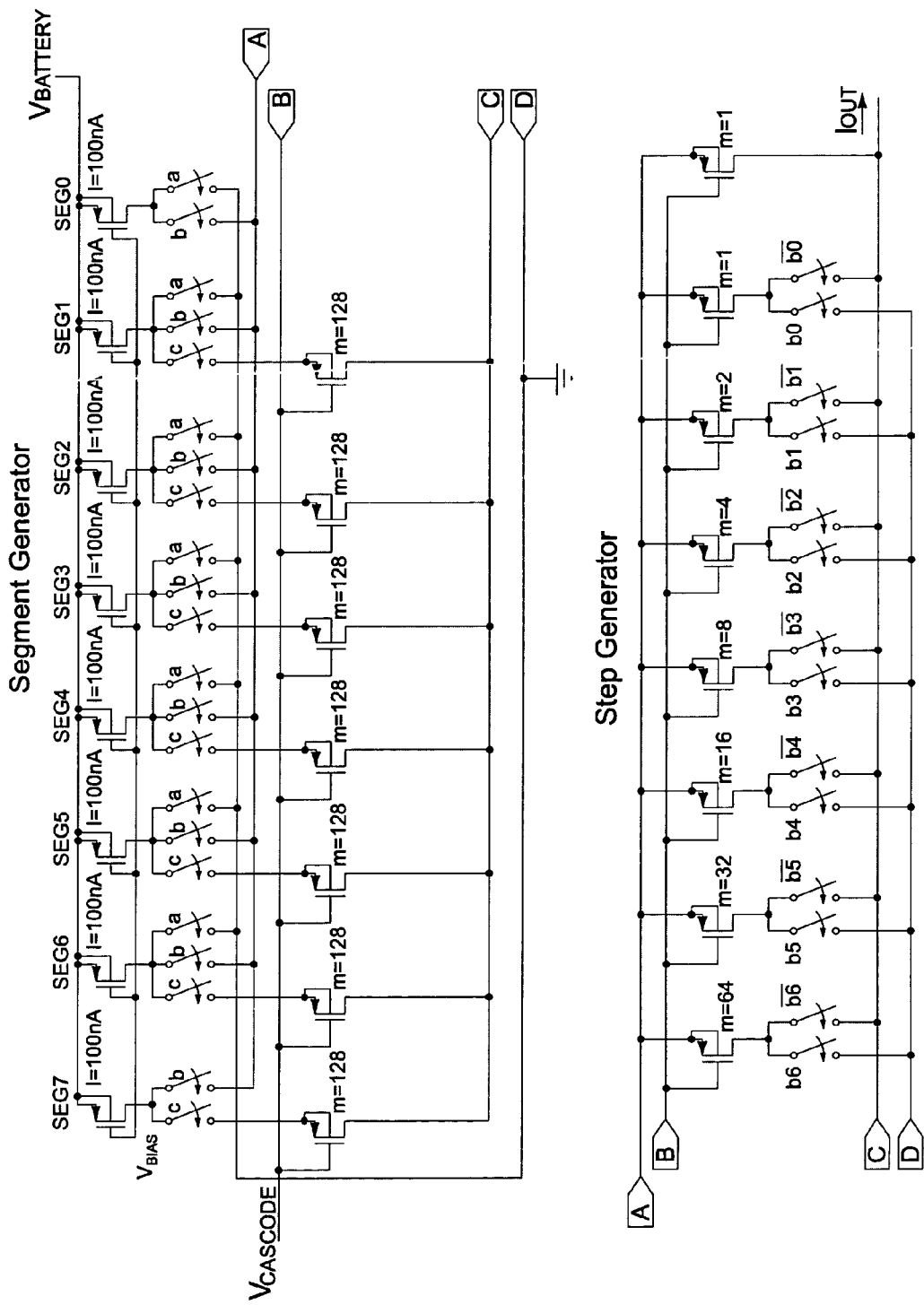
FIG. 11 is a schematic diagram of an inverted segmented DAC that may be used in one embodiment of the invention.

Referring to FIG. 11, the INP reference input node of the LPTC of FIG. 10 can be driven by a programmable, Inverted Segmented DAC such as shown in detail in FIG. 11. The $I_{out}$ terminal generates the desired INP voltage when connected to an appropriate current to voltage converter (see 5006 of FIG. 12). One skilled in the art may recognize this as a variation of a conventional segmented DAC with the NMOS transistors having been replaced by PMOS transistors so as to simplify making a ground-referred voltage out of the DAC output current. For a description of relevant art, see "Bipolar and MOS Analog Integrated Circuit Design" by Alan B. Grebene (John Wiley and Sons, 2003), incorporated herein by reference. The Inverted Segmented DAC of FIG. 11 includes a step generator section and a segment generator section. An advantage of the Grebene DAC is that it assures monotonic response to increasing binary inputs. Other DAC designs may be used however.

Figure 12:
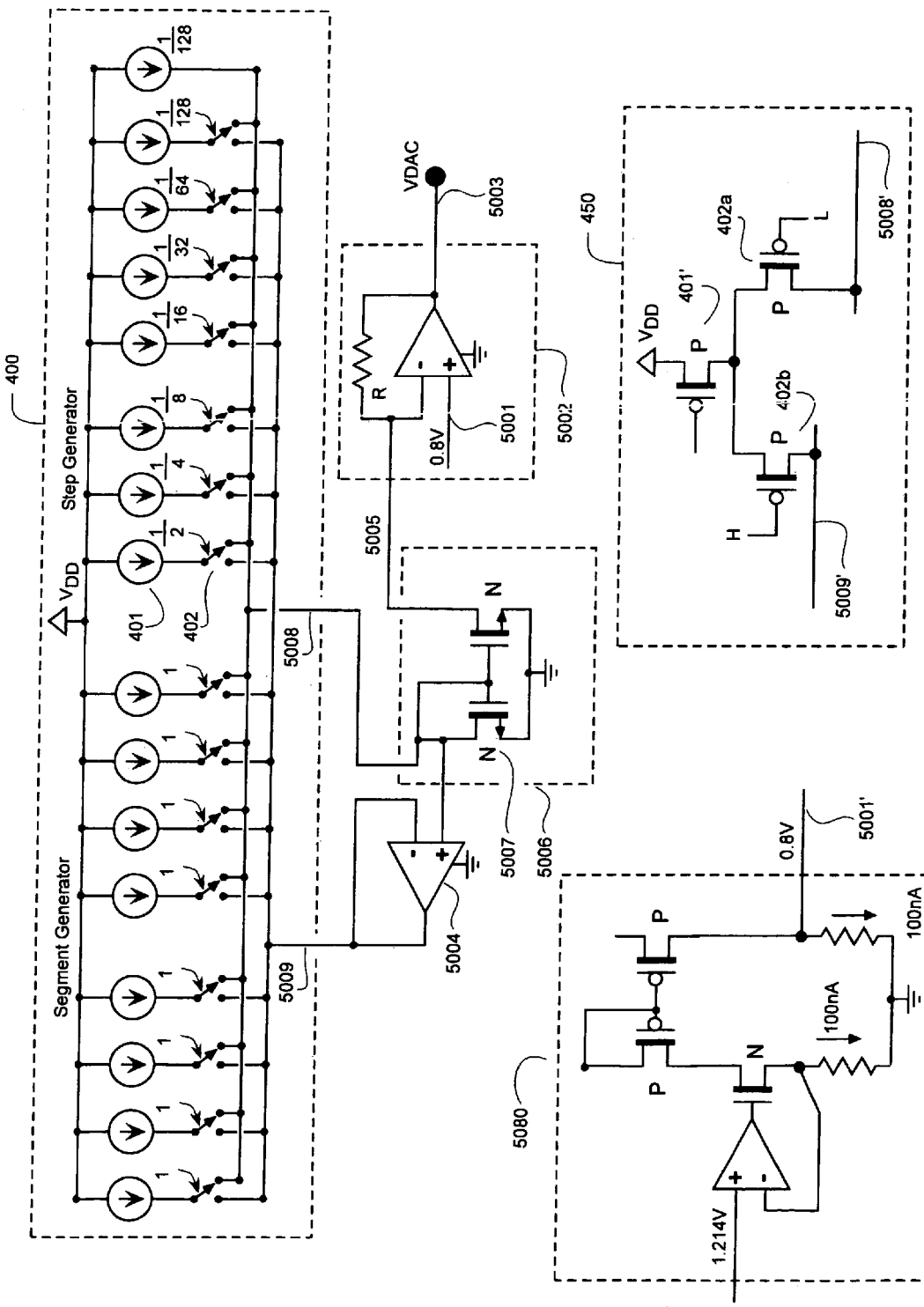
FIG. 12 is a schematic diagram of low power programmable DAC that may be used in one embodiment of the invention to supply a reference voltage to the INP node of the LPTC of FIG. 10.

Referring to FIG. 12, a more complete rendition 500 of how the INP reference voltage can be programmably generated in accordance with the invention is shown. Box 400 shows a schematic representation of the variation on the DAC of Grebene (FIG. 11), with line 5008 carrying the output current into the diode-connected, first NMOS transistor 5007 of current mirror 5006, and voltage follower 5004 feeding back the resultant drain voltage from NMOS transistor 5007 to common sink line 5009 of the step generator section and the segment generator section. A current to voltage converter 5002 reproduces on output terminal VDAC, a programmably-defined output voltage corresponding to the drain current of the diode-connected, left transistor 5007 of current mirror section 5006.

Operation is as follows. Each segment driver is configured to output a first magnitude of reference current. Each step generator is configured to output a respective binary fractional portion of the first magnitude of reference current. The sum of the output-directed currents from programmably-selected ones of the segment and step generators (plus the one always-on 1/128 step source) appears on first sink line 5008 and is directed through the drain of left side NMOS transistor 5007 of current mirror 5006. Essentially the same sum-defined current is drawn down by way of line 5005 and through the feedback resistor R of the operational amplifier 5002 such that the current-to-voltage converter containing amplifier 5002 generates an output voltage, VDAC approximately equal to 0.8V+IR. (A precision voltage reference such as 1320 (FIG. 13) or 5080 of FIG. 12 can supply the 0.8V level or another base level as may be desired.) In one embodiment, the voltage reference is of a band-gap design (e.g., 1.214V) obtained from LTRIM Technologies, of Montreal, Canada. Other low voltage reference designs with small power consumption may be used instead. The size of resistor R in circuit 5002 sets the ratio of current to voltage presented at terminal VDAC. The 0.8V level of the illustrated embodiment is just a preselected base voltage value for when the binary input is zero so that input bits do not have to be wasted in corresponding register 1316 (FIG. 13) on specifying voltages outside of a predefined output voltage range (in this case 0.8V to 3.4V for VDAC). It is understood that only the lower 10 bits of the DAC 500 shown in FIG. 12 are programmable by the 10-bit register 1316 of embodiment 1300 and the excess, higher value current sources may be shut off or fixed in setting of their switches 402 as appropriate.

Exploded view 450 of FIG. 12 shows a more detailed schematic of the digitally actuated current switch 402 and its current source 401. For purpose of accuracy, it is desirable that a same drain voltage appear on current sourcing PMOS transistor 401' irrespective of whether its source-to-drain current is being directed to first sink line 5008' or to second sink line 5009'. Moreover, it is desirable that essentially no current flow through PMOS transistor 402b (left side) when its counterpart transistor 402a (right side) is digitally turned on, and vise versa. To accomplish this, the voltage appearing on first sink line 5008' is reproduced on second line 5009'. This is done by use of voltage follower 5004. In the case where the right PMOS transistor 402a is turned on (is rendered conductive by applying a low logic voltage, L to its gate), its source-to-drain voltage drop is relatively small (almost zero). If the same source-to-drain voltage drop is forced across the left PMOS transistor 402b while a high logic voltage, H is applied to its gate; essentially no current will flow through the left PMOS transistor 402b. Thus the left side transistor 402b is assuredly turned off (irrespective of temperature variations) in this example. On the other hand, and due to symmetry, if a high logic voltage, H is instead applied to the gate of the right transistor 402a and a low logic voltage, L is instead applied to the gate of the left transistor 402b, essentially no current will flow through 402a and the sourced current of 401' will instead flow through transistor 402b. This action minimizes undesired current leakage into the first and second sink lines 5008(') and 5009(') and thereby reduces DAC output error. The dynamic balancing of the source-drain voltages of transistors 402a and 402b is a particularly effective solution when operating temperatures are prone to change. In one embodiment, all of the transistors described are fabricated on a common monolithic integrated circuit so that process variations do not affect circuit operation.

Figure 1:
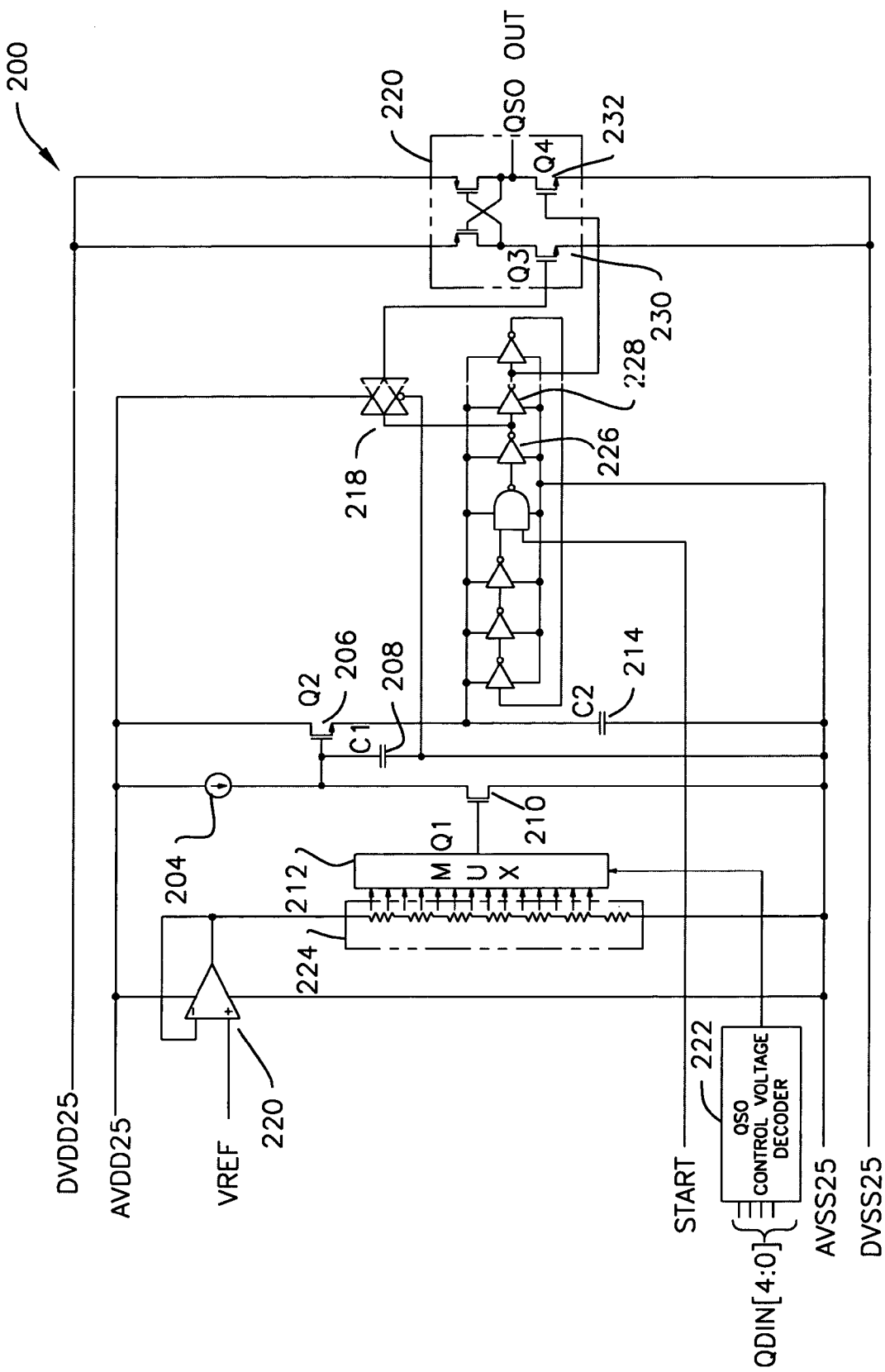
FIG. 1 is a schematic diagram of an analog-containing section of a quick start oscillator (QSO) in accordance with the invention.

Referring to FIG. 1 a mostly-analog portion 200 of a quick-start oscillator (QSO) such as may be used in accordance with the invention is shown. Line AVDD25 supplies a first, analog-driving voltage ($V_{aDD}$) to analog sections of the QSO. Line DVDD25 supplies a second, digital-driving voltage ($V_{dDD}$) to digital sections. These may have same or different voltages depending on design choices. Lines AVSS25 and DVSS25 are the corresponding analog and digital ground return connections. In one embodiment of the example shown, $V_{aDD}=V_{dDD}=+2.5$ volts.

Line VREF connects a supplied reference voltage (e.g., from 1320 of FIG. 13) to a non-inverting input terminal of voltage follower 202. The buffered reference voltage output by the Voltage Follower 202 is applied to a tapped resistor string 224, which further connects to the analog ground line, AVSS25. In one embodiment, the resistor string 224 has thirty-two (32) equally spaced-apart taps coupling to respective input terminals of a digitally-controlled multiplexer, MUX 212. Decoder 222 provides a 5-bit to a 1-of-32 decoding function so that one of the 32 taps is selected by 5-bit digital input word, QDIN(4:0). The latter is the digital control signal that defines the desired VCO drive voltage. In one embodiment, the reference input voltages to the MUX 212 inputs range from 1.214 VDC at the top tap to 0.1539 VDC at the lowest tap, in equal steps of approximately 34 mV between taps. MUX 212 couples respectively selected ones of these reference input voltages to a gate of PMOS transistor 210 (also denoted as Q1). As already indicated, the target voltage at which the oscillator will operate is coded as a five-bit word on lines QDIN[4:0] and applied to the QSO control voltage selecting decoder 222. MUX 212 responsively couples the selected one tap from the resistor string 224 to the control gate of FET Q1 (210).

PMOS transistor Q1 (210) functions to level up-shift the output voltage of MUX 212 to a level appropriate for the gate of NMOS transistor Q2 (206). The NMOS transistor Q2 (206) functions to level down-shift its gate voltage to a level appropriate for voltage-controlled oscillator ring 210. This level shifting accommodates for temperature changes and process variations. Current Source 204 supplies bias current to the level shifting pair formed by Q1 (210) and Q2 (206). Together Q1 (210) and Q2 (206) isolate the ring oscillator 216 from MUX 212 and thereby block the ring oscillator 216 from undesirably drawing current out through the upper resistors of resistor string 224. Such a resistor sourced draw of current could cause the ring oscillator control voltage to be noisy and could detrimentally affect the quality of the oscillations induced in the ring oscillator. The gate-to-source voltages for Q1 (210) and Q2 (206) track with one another over temperature thereby helping to maintain QSO output accuracy even as temperature varies. The small difference between NMOS and PMOS gate-to-source voltages is compensated for by a software calibration routine that may be executed external to the QSO to establish the appropriate QDIN data signal for driving decoder 222. In an alternate embodiment, the calibration may encode appropriate offsets into decoder 222. Capacitor C1 (208) couples from the gate of Q2 (206) to analog ground. Capacitor C2 (214) couples from the source of Q2 208 to analog ground. These capacitors provide noise bypassing to ground, thereby reducing jitter in the control voltage applied from the source of Q2 (208) to the ring oscillator circuit 216.

An important aspect of the illustrated QSO 200 is that essentially all of its frequency-affecting control inputs are normally static during quick-starting except for two signals: (1) the binary START signal that couples into the NAND gate of ring oscillator 216, and (2) the voltage at the source of NMOS transistor Q2 (206, which voltage is same as across capacitor C2/214). Thus the only changes needed in one embodiment for switching QSO 200 from its dormant state to its steady-state oscillating mode is to switch START high and bring the ring oscillator's VCO voltage ($V_{vco}$) from an initial value ($V_{vco1}$) to a steady-state VCO voltage level ($V_{vco2}$). When the START signal is at logic low, the NAND gate in block 216 keeps the ring oscillator's positive feedback loop disconnected and thus no oscillation occurs. Since in one embodiment, block 216 consists of CMOS logic, it draws essentially no current while START is low. Consequently, NMOS transistor 206 (Q2) has a drain-to-source current of essentially zero ($I_{DS}=0$) and a corresponding gate-to-source voltage of essentially zero ($V_{GS}=0$) at this time. The voltage at the source equals the voltage at the gate of Q2 (in other words, $V_{S2}=V_{G2}=V_{C1}$). As START switches to high and the ring oscillator 216 becomes perturbed by that action and begins to draw current, the $I_{DS}$ of Q2 increases from zero towards the steady-state current that will be drawn by block 216. At the same time, the voltage ($V_{S2}$) at the source of Q2 drops from its initial value when $V_{GS}$ was zero towards the stable-state voltage ($V_{vco2}$) that will be applied across the power rails of block 216 as the ring oscillator 216 settles into a steady-state oscillating mode. The frequency of the ring block 216 may not be stable as the voltage ($V_{S2}$) at the source of Q2 drops from its initial, comparatively high value ($V_{vco1}$) towards its stable-state voltage level ($V_{vco2}$); and as a result the output frequency of ring block 216 may be momentarily higher than permitted within the subsuming circuitry (e.g., within system 1300 of FIG. 13). In order to compensate for this, usage of the QSO output signal (QSO_OUT) is delayed in one embodiment until a GOOD signal goes high as is detailed below. (In one embodiment, GOOD does not go high until the started up ring oscillator has output 8 pulses. The number 8 is empirically determined and can be smaller or larger, e.g., in the range 2 to 100; or alternatively, in the range 4 to 16.) There is an advantage to starting up the ring oscillator 216 with a VCO voltage ($V_{vco1}=V_{S2}=V_{G2}$) greater than the steady-state VCO voltage ($V_{vco2}=V_{G2}-V_{GS2}$) applied to the ring oscillator when the desired (target) frequency is attained. The advantage is that a stronger amount of start-up perturbation power is input into the ring oscillator 216. Voltage is relatively high as current drawn by block 216 climbs up from roughly zero. (As a result, drawn power which is a function of current multiplied by voltage, is also relatively high as current drawn by block 216 climbs up from roughly zero to a larger amount.) This higher initial draw of input power helps the ring oscillator to start up faster than if the VCO voltage ($V_{vco}$) had been driven from zero up to the steady-state VCO voltage ($V_{vco2}$) at the same time the current drawn by block 216 was also climbing up from zero. Capacitor C2 may be sized to store sufficient charge for helping the oscillator to get kick started towards its steady-state mode, although C2 should not be so large as to substantially slow down its own discharge from the initial VCO voltage ($V_{vco1}=V_{S2}=V_{G2}$) down to the steady-state VCO voltage ($V_{vco2}=V_{G2}-V_{GS2}$). The primary purpose of C2 is to act as a noise filter for keeping the steady-state VCO voltage substantially free of noise.

The illustrated ring oscillator 216 is a seven-element ring oscillator with the loop-closing/opening NAND gate being schematically positioned midway between three inverters to its left and three inverters to its right (the right ones including 226 and 228). The NAND gate or an equivalent loop breaker can be positioned as desired in the chain of odd-numbered inverters for selectively switching the loop gain of the loop from below unity (nonoscillating) to above unity (oscillating). In an alternate embodiment, the ring oscillator could have three or five inverting stages forming its positive feedback loop; or an odd number greater than the illustrated seven. Use of at least five inverting stages allows for uniformly isolated distribution of output loads as is carried out by inverters 226 and 228 in the illustrated embodiment. The frequency of oscillation is controlled by the ring oscillator control voltage ($V_{vco}$), which voltage is in turn controlled by the voltage presented at the gate of Q2 and the current drawn by the ring oscillator. The gate voltage of Q2 is in turn controlled by the register-saved QDIN(4:0) signal as converted into an analog counterpart by DAC 212. In cases where the ring oscillation is started while the register-saved QDIN(4:0) signal is at or very close to the value needed for obtaining the target-defined oscillation frequency, the time need to reach target frequency can be small. It can be much smaller than about 30 μS in the case where such a single period of a roughly 32 KHz clock (C33K, describe below) is used as a reference for frequency calibration. Oscillation is initiated by assertion of a logic high at input terminal START. Such assertion can be provided by the LPTC 1000 and OR gate 1332 described above and/or by other associated logic. In one embodiment, after a given LPTC asserts a logic high on one input (i.e., 1331a) of OR gate 1332 and thereby causes the minicontroller (1355) to awaken, the minicontroller asserts a second logic high on another input (i.e., 1331c) of the OR gate 1332 via a flip flop or otherwise and thereby renders the first logic high (1331a) superfluous. The minicontroller (1355) can then switch the alert-generating LPTC into power down mode (PD=1) to save power without risking loss of oscillation in the ring oscillator 216 (or 1333 as it is represented in FIG. 13). In FIG. 1, two complementary outputs from ring oscillator 216 drive the inputs of level shifting output circuit 220. The illustrated level shifting circuit 220 operates to increase the voltage swing of the ring oscillator oscillations from the control voltage established across the VCO power rails to the full voltage of line DVDD25, which in one embodiment, is the 2.5 V digital supply level.

The output from ring oscillator stage five (inverter 226) connects to the input of a transmission gate 218, and then from the output of that transmission gate 218 to the gate of transistor Q3 (230) in the level shifting output circuit 220. The complementary output from ring oscillator stage six (inverter 228) is connected to the gate of Q4 (232). Transmission gate 218 functions to delay the output of ring oscillator stage five such that the complementary inputs to the output level shifter 220 arrive at the respective gates of Q3 (230) and Q4 (232) with about the same delay relative to the node connecting inverter 226 to inverter 228. As seen, the PMOS transistors in output circuit 220 are cross-connected to define a bistable combination. Line QSO_OUT from the OUPUT Level Shifter 220 carries the level-shifted ring oscillator output signal. Insulated gate transistors 230, 232 decouple the output stages 226, 228 from possible variations of loading at the buffer output node (QSO_OUT) thereby preventing load variations from affecting the operation of the core oscillator 216. Transistors 230, 232 also provide the level shifting between the core oscillator 216 and the QSO_OUT output node. In the embodiment of FIG. 1300, the buffered QSO_OUT signal continues into a frequency-setting logic loop that includes blocks 1334 and 1335.

Figure 2:
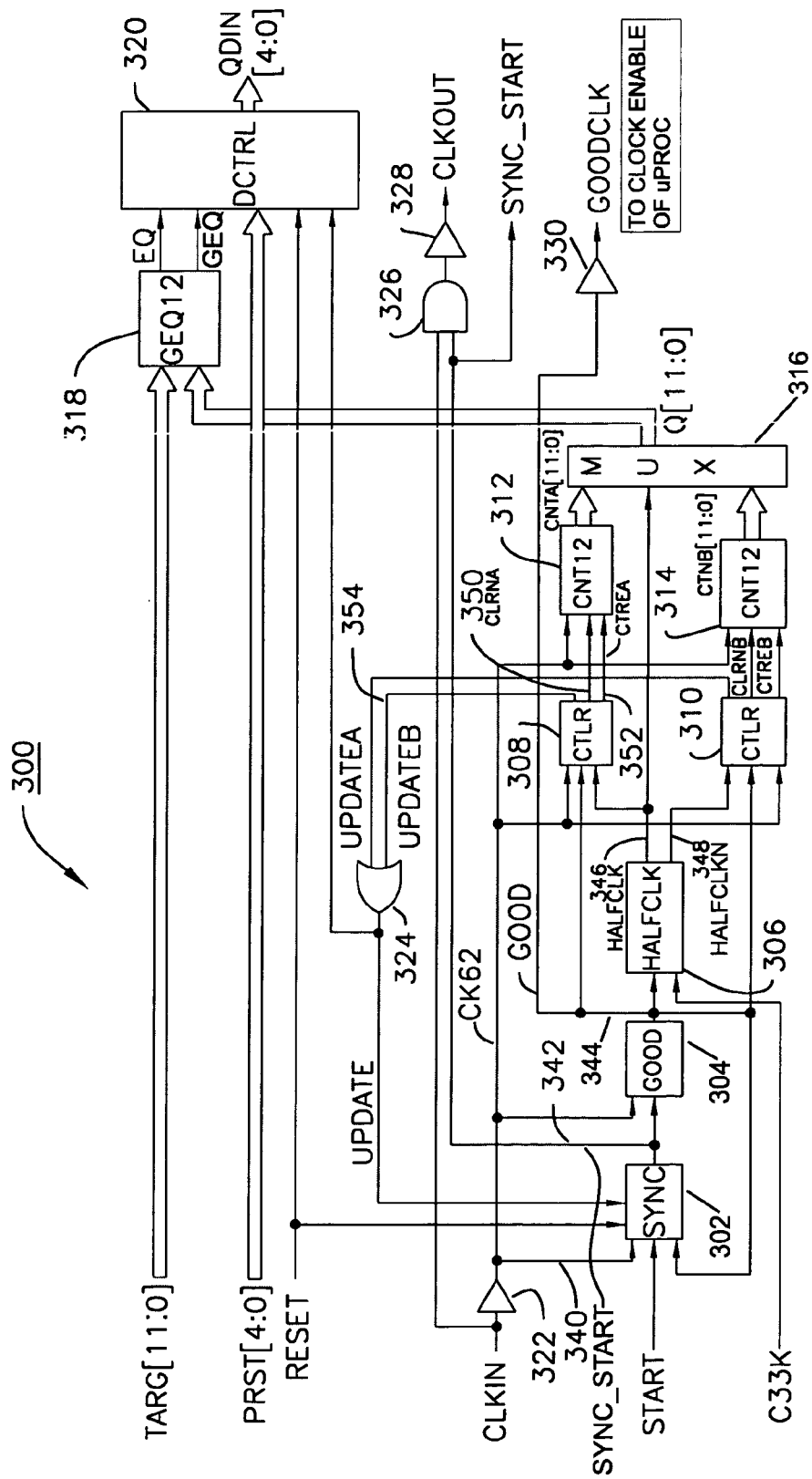
FIG. 2 is a schematic diagram of a digital control and calibrate section usable in combination with the quick start oscillator section of FIG. 1.

Referring to FIG. 2, a global view of one digital control loop that may be used in part or in whole with the analog section of the QSO, is shown as digital control block 300 and possible details thereof follow in FIGS. 4-9. While this particular embodiment 300 includes an oscillations-sustaining block 302 (labeled as a SYNC block) which causes the analog section (FIG. 1) to remain in a started up state at least until one edge-to-edge period of the slow reference clock (C33K) has elapsed and the QDIN control word has been updated and stored, it should be stressed that a number of alternate variations are possible concerning how the analog section (FIG. 1) is kept running even if the START signal from a triggering LPTC goes low and concerning when and for how long the analog section (FIG. 1) is kept oscillating for purpose of recalibrating the QDIN control word. If the oscillations-sustaining block 302 (SYNC) is removed from FIG. 2 and START instead couples directly to SYNC-START, then one or both of the real time clock (1321) and minicontroller (1355) may have control signals ORred into the START signal for initiating and sustaining QSO oscillations as may be desired.

In one embodiment, the QSO_OUT line of FIG. 1 couples to the CLKIN terminal of FIG. 2. The CLKIN oscillates at relatively high frequency such as around 62 MHz while a reference oscillation of much lower frequency, such as about 32 KHz in the illustrated embodiment is supplied to line C33K. The overall control loop (block 300 in combination with 200 of FIG. 1) is organized so that a desired number of clock ticks from the high frequency line (CLKIN) will fit between a rise-to-rise measured period of the C33K reference or between a falling-to-falling edge measured period of the C33K reference. That desired number of high frequency clock ticks may be specified by the TARG(11:0) target-specifying digital input. In an alternate embodiment, C33K may be controlled to be a symmetrical square wave and the time span between one rising and an adjacent falling edge may be used as a reference time period for determining how many CK62 ticks fill that time span. The observed count is output by digital multiplexer 316. The greater than or equal to state of the two values is determined by GEQ12 circuit 318. Digital control block 320 then responsively makes appropriate adjustments to the QDIN(4:0) VCO-controlling output so as to bring the actual count (output of 316) closer to the target value (TARG(11:0)). In one embodiment, storage is provided in the main memory 1351 or elsewhere for storing the target value signal, TARG(11:0) and also an associated PRESET(4:0) value signal. Alternatively, either one or both of PRESET(4:0) and TARG(11:0) may be stored in a nonvolatile memory means such as PROM or EEPROM. If dynamic memory is used, the main controller 1350 may be enabled to adjust the PRESET(4:0) and TARG(11:0) values during normal system run time and the data stored for these is later presented to the frequency calibrator (e.g., FIG. 2) for use during QSO start up and/or recalibration. As will be seen, the PRESET(4:0) value can represent an initial, empirically determined guess for the mean QDIN(4:0) value that will be achieved. Upon initial start up (with no QDIN being already established), the calibration system starts at the PRESET(4:0) value and increments or decrements QDIN(4:0) from there as the calibration system converges in on the TARG(11:0) specified, target frequency.

Note that the CLKIN line continues within FIG. 2 into one input node of AND gate 326 and a buffered version of CLKIN continues into SYNC block 302 and others as the CK62 signal. When SYNC_START is high, AND gate 326 outputs the CLKIN signal via output buffer 328 to the CLKOUT line. A SYNC_START low state prevents noise on the unbuffered CLKIN line, should there be any, from producing an undesired pulse on the buffered CLKOUT line.

In one embodiment, it has been found that upon start up, the CLKIN signal should be allowed to oscillate through about 8 of its own cycles immediately after START is asserted before it can be deemed that the VCO has safely stabilized into steady state while operating in a prespecified temperature range. It has been observed that at nominal room temperature, the VCO often attains its steady state period after as little as just two of its own cycles. A stabilized, steady-state oscillating mode of the VCO does not necessarily mean an on-target output frequency however. In one embodiment, a high GOODCLK indicates the 8 tick delay has elapsed.

The illustrated digital control block 300 functions primarily as an auto-calibrating subsystem which compensates for temperature, process, and supply voltage variations in the analog portion of the QSO so as to output an appropriate QDIN[4:0] signal for setting the voltage of the VCO 216 in FIG. 2 such that a frequency fairly close to the target frequency is attained. In one embodiment the target frequency of the QSO is approximately 62 MHz. A twelve-bit word, TARG[11:0] is supplied in FIG. 3 to the GEQ equal-or-greater block 318 (FIG. 8) as a digital representation of the target oscillator period. A counterpart comparison signal comes from MUX 316. (Full scale for the 12 bits is 0FFFh. Of course other numbers of bits may be used depending on desired resolution.) In addition to the equal or greater-than signals from GEQ block 318, a five-bit input signal, PRST[4:0] connects to a DCTRL block 320 for providing an initial default value for QDIN as determined for example by a calibration routine that can be executed off line or by the main controller 1350 when awake. (While not shown, it is understood that, in one embodiment, the awake main controller 1350 has read access to the QDIN output signal of block 320, write access to the register (not shown) that stores PRST(4:0) and that the awake main controller 1350 can force the QSO to run through one or more self-calibration operations.)

The DCTRL block 320 generates and stores the QDIN[4:0] signal, where the latter is used for digitally driving the analog portion (FIG. 1) of the QSO 200 to oscillate at the target frequency. The GEQ12 block 318 instructs the DCTRL block 320 on whether to increment, decrement or do nothing to the currently-stored and output QDIN(4:0) signal. As will be seen in FIG. 9, QDIN(4:0) can change to its new value (a range limited value) when UPDATE is temporarily asserted by OR gate 324.

When the START terminal is raised high (asserted) by the LPTC or another circuit, not only does the analog QSO section 200 (FIG. 1) start up, its digital control block 300 (FIG. 2) also starts up. Among other things, the illustrated digital control block 300 determines whether the VCO has been running for a sufficiently long time (e.g., between an edge to edge period of the C33K reference clock) such that it is possible to use one of the counts from counters 312 and 314 for updating the QDIN output word.

Figure 3:
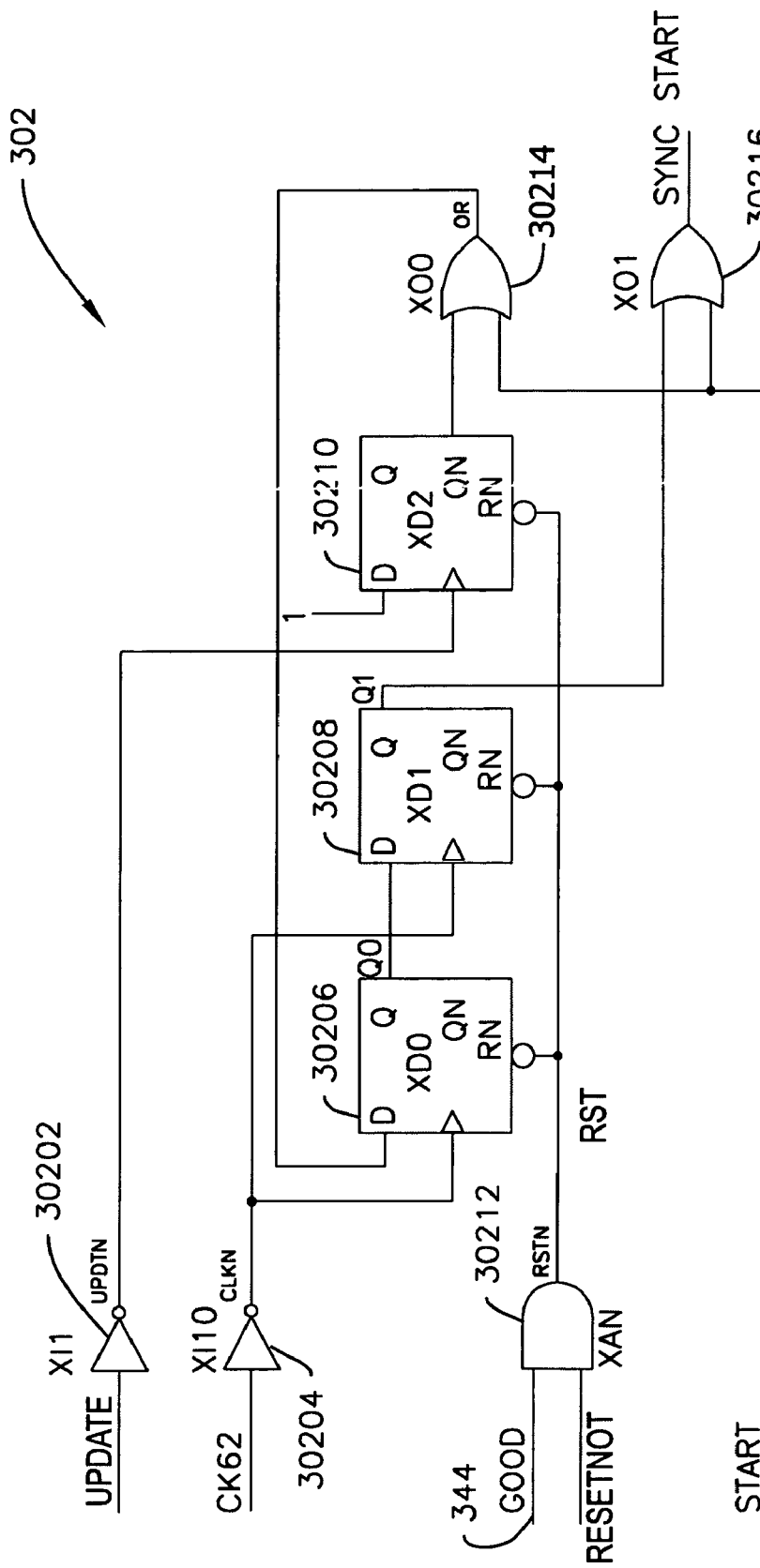
FIG. 3 is a schematic diagram of a digital timing block (SYNC_START timing block) which may be used in the QSO control system of FIG. 2.

Referring to FIG. 3, if START is low, and Flip Flop (FF) 30208 is outputting a Q=0 signal to OR gate 30216, then SYNC_START will be low and no CLKOUT pulses will issue from AND gate 326 of FIG. 2. On the other hand, if an LPTC or another means switches the START input signal to a high state, then SYNC_START will go high by action of OR gate 30216 and 8 ticks later as measured on the CLKIN line, the GOOD input signal will go high as a result of the circuit shown in FIG. 4. When GOOD switches to high (and Reset-Not is also high, as it is when the system is not in a power-up or reset mode), AND gate 30212 will enable the latchup circuit composed of Flip Flops (FF's) 30206, 30208 and 30210 by releasing them from their reset states (Q=0, QN=1). The QN=1 state of FF 30210 propagates through OR gate 30214 and ripples through FF's 30206, 30208 because the CK62 high frequency clock signal is also running by this time. This sequence produces a Q1=1 condition at the output of FF 30208. That keeps SYNC_START latched high even if START goes low.

The latchup circuit switches to a QN=1 state later on, when UPDATE toggles the clock input of FF 30210 and two ticks of the CK62 clock elapse. (The two tick delay assures that a newly updated value of QDIN in the DCTRL block 320 has time to be stored in the output register of FIG. 9 as will be later seen).

Figure 4:
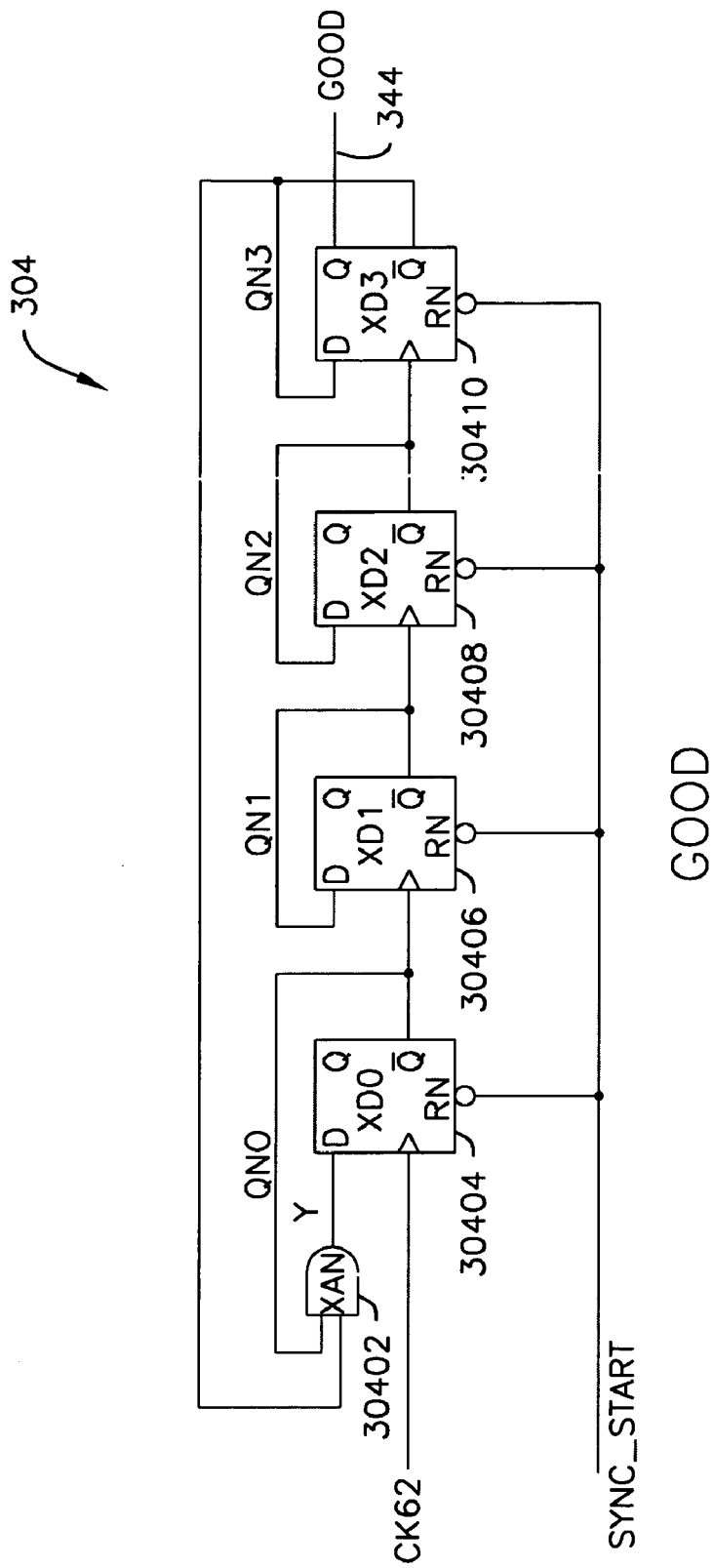
FIG. 4 is a schematic diagram of a GOOD signal generating block that may be used in the digital control section of FIG. 2.

Referring to FIG. 4, a user or designer of the system can determine, though simulation, bench results or the like, what worst-case number of initial clock cycles of the CK62 signal may be required before the QSO output stabilizes into its steady state frequency after SYNC_START first goes high. In one embodiment, it has been found that a safe delay for assuring steady-state VCO frequency is about eight clock cycles of the VCO. Referring to FIG. 2, all Q-bars are high while SYNC_START is low. The switch of SYNC_START to high causes the ripple counter of the GOOD logic block 304 to count out a delay of eight cycles of the CK62 clock before it latches the GOOD output signal on GOOD output line 344 to high. This GOOD output line 344 connects to the input of the GOODCLK buffer 330. The buffered output signal is designated as GOODCLK. In one embodiment, GOODCLK connects to the clock enable (CE) pin of the microcontroller chip.

Figure 5:
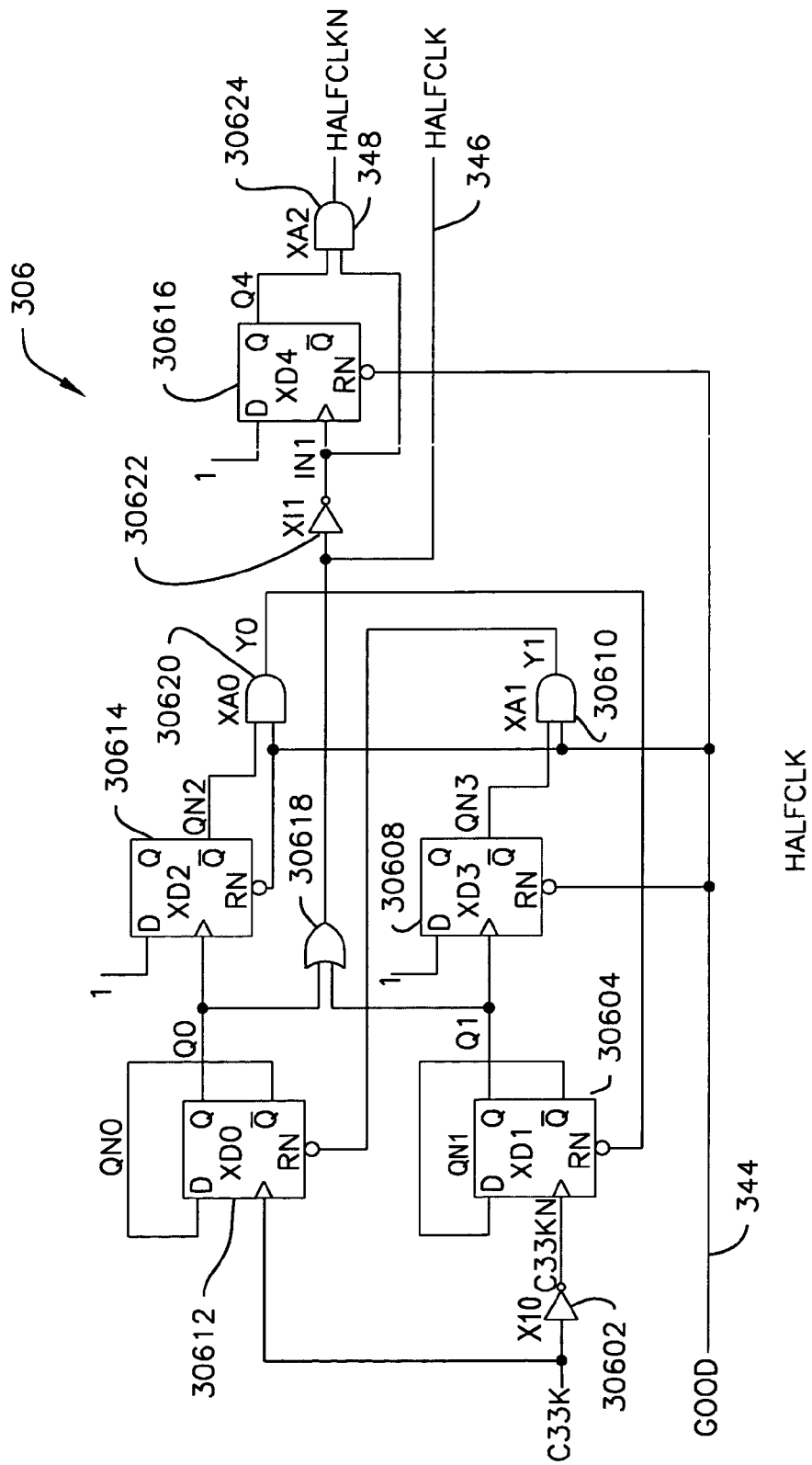
FIG. 5 is a schematic diagram of a HALFCLK detecting block that may be used in the digital control section of FIG. 2 for determining whether calibration for a given counter will be between rising edges or between falling edges of the slow reference clock (C33K)

Referring to FIG. 5, with GOOD 344 having flipped high to indicate that the CK62 clock signal is at steady state frequency for the currently registered value of QDIN, the HALFCLK block 306 of FIG. 5 can now begin to scan for the next rising or falling edge of the slow reference clock, C33K. In one embodiment, C33K is connected to a 32.768 kHz external reference clock source whose precision is provided by a crystal. Because the C33K is so slow relative to the CK62 clock, in some embodiments it is undesirable to fixate on and wait until a next "rising" edge of C33K shows up for marking the start of a next C33K period. Either edge will do as a marker and it is possible to use whichever edge appears next after GOOD 344 has switched high. The HALFCLK block 306 of FIG. 5 indicates the start of a reference C33K period either as being off of a rising edge or a falling edge of the slow C33K clock, whichever comes first. In FIG. 5, a logic low on input line GOOD 344 forces high outputs at output nodes QN2 of FF 30614 and QN3 of FF 30608 while forcing the Q4 output of FF 30616 to a logic low. Output Y0 from AND gate 30620 and output Y1 from AND gate 30610 are both low as a result, thereby holding respective D flip-flops 30612 and 30604 in reset mode. With the Q outputs of FF 30612 and FF 30604 forced low by the reset mode, OR gate 30618 receives two lows and correspondingly causes output line HALFCLK 346 to be low. The low on the Q4 output of FF 30616 causes HALFCLKN 348 to also be low by virtue of AND gate 30624.

When GOOD 344 goes high, both Y0 and Y1 become high, thereby releasing FF 30612 and FF 30604 from their private reset modes. A first edge in either up or down direction of clock line C33K causes the output of OR 30618 to go high, thereby causing HALFCLK 346 to go high. (In this embodiment, HALFCLK 346 does not indicate which kind of CK33 edge; rising or falling, flipped it high. It merely indicates that one of those edges arrived). The flipped HALFCLK signal 346 remains high for one period of the precision clock signal on line C33K, after which HALFCLK 346 goes low and HALFCLKN 348 goes high. HALFCLK 346 and HALFCLKN 348 may continue to switch in this way until GOOD 344 goes low.

Referring to FIG. 2, multiplexer 316 receives outputs of two ripple counters, 312 and 314, and selects one of these outputs as the latest valid count of how many CK62 ticks fill a marked period of the C33K reference clock signal. The period to be used, be it rising-edge to next riser or falling edge to next faller, is determined by the HALFCLK signal 346 and its opposed complement, HALFCLKN 348. Thus, based on the switching phases of the HALFCLK 346 and HALFCLKN 348 signals, in the illustrated embodiment, first one of the ripple counters CNT12 312 and then the other (314) is used to provide a count of the number of analog-sourced, CLKIN cycles (FIG. 2) that fit into the 32.768 kHz precision period measured by clock signal C33K. The latest count is compared to the target value in TARG[11:0] by the GEQ12 block 318. The outcome of the comparison (>, =, <) is provided to logic block DCTRL 320, where the latter responsively increments, decrements, or leaves unchanged the digital code, QDIN[4:0] sent to the QSO control voltage decoder 222. As explained, QDIN[4:0] drives the analog Mux 212 which establishes the control voltage of the VCO in the analog portion of QSO. As explained above, the incrementing or decrementing of QDIN [4:0] so as to keep the count at or near the target value, TARG does not have to occur each time START goes high. The latchup circuit of FIG. 3 causes the latter to happen in the illustrated embodiment, but if START were shorted to SYNC- _START in FIG. 3 and all logic within FIG. 3 were removed; some other means may be used to determine if and when the SYNC_START signal remains high sufficiently long so that the count-enabling circuit (308, 310) of FIG. 6 enables its respective counter to count the number of CK62 ticks that occur through a full period of the C33K reference clock.

Figure 6:
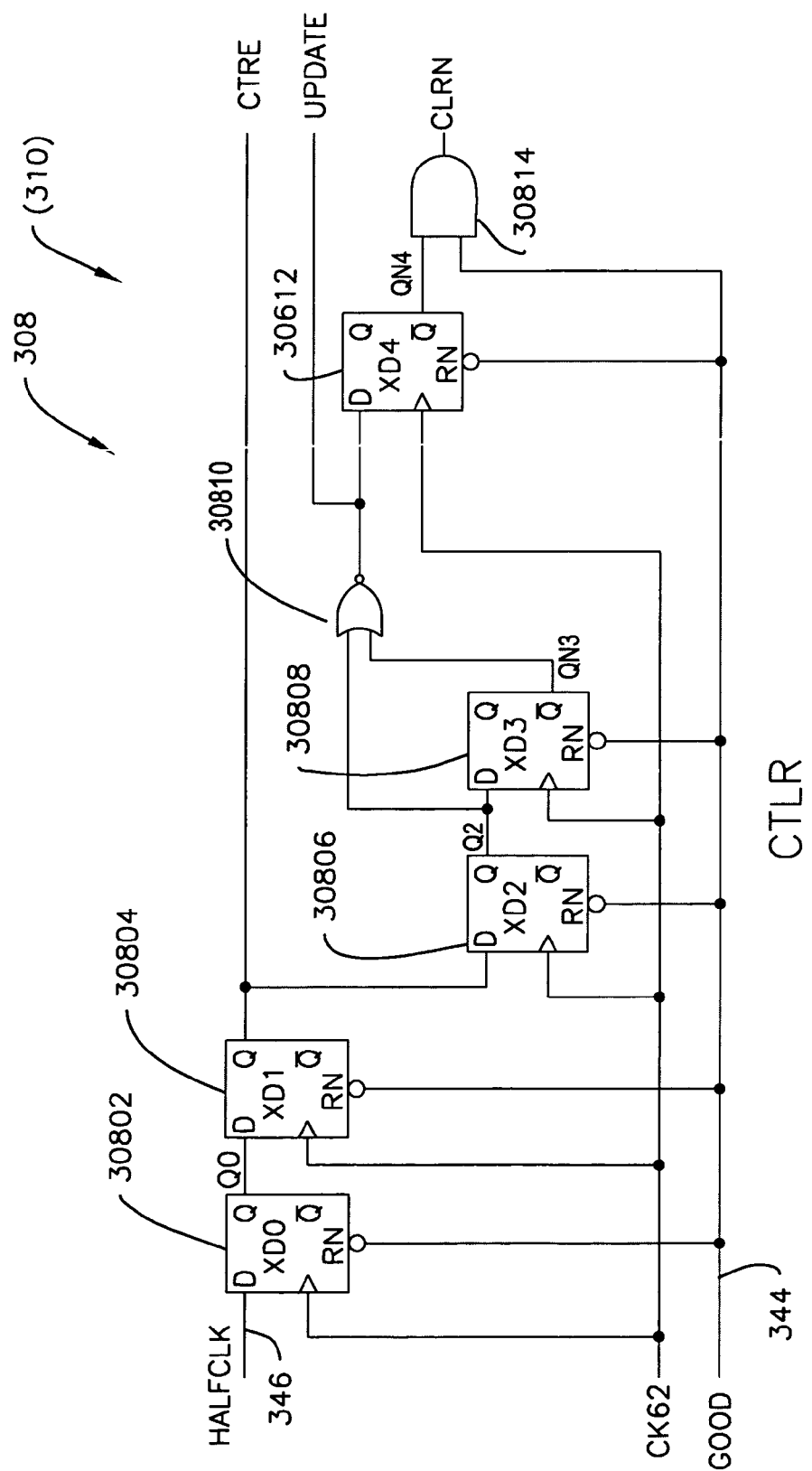
FIG. 6 is a schematic diagram of a CTLR block that may be used in the digital control section of FIG. 2 for generating a local UPDATE timing signal.

Referring to FIG. 6, the counter controller circuits (308, 310 for respective counters 312 and 314 of FIG. 7) each have a counter resetting, output signal, CLRN that is active low; a counter enabling, output signal, CTRE that is active high and an UPDATE pulse generating line for indicating when a QDIN update transition should occur. In FIG. 6, when GOOD 344 is low, the Q output of FF 30802, of FF 30804, and the Q output of FF 30806 are reset to low. At the same time, the Q-bar outputs of FF 30808 and 30812 are reset to high. Outputs CTRE 352, UPDATE 354, and CLRN 350 are thus driven low. On the first rising edge of the CK62 signal following a rise to high level on the GOOD line 344 (indicating 8 ticks of the CK62 clock have passed per FIG. 4), the logical value of HALFCLK 346 is clocked through FF 30802 to its Q output. One CK62 clock cycle later the value of HALFCLK 346 appears on line CTRE 352. If HALFCLK 346 is low, CTRE 352 remains low and counting of CK62 ticks does not commence in the associated counter. If HALFCLK 346 switches to high, then two ticks later of the CK62 clock CTRE 352 also goes high and stays that way until HALFCLK 346 next goes low and two clock ticks of CK62 elapse. Then CTRE responsively gos low, thus stopping the associated counting of CK62 pulses in the counter circuit of FIG. 7.

NOR gate 30810 generates the UPDATE pulse as the logic NOR of the Q output of FF 30806 and the Q-bar output of FF 30808. The latter two are both low, and therefore UPDATE is high for one clock cycle after CTRE goes low. (In FIG. 2, the asserted UPDATEA or UPDATEB signal of either controller A (310) or B (308) is distributed via OR gate 324 to SYNC block 302 and to DCTRL block 320.) On the next CK62 clock cycle, UPDATE 354 goes low again. In response, CLRN 350 goes low for the following one period of the 62 MHz clock and then back high again and stays high. CLRN will next pulse low for one tick of the CK62 clock after UPDATE next pulses high for one tick of the CK62 clock after CTRE was high for one marked period of the C33K reference clock.

Logic block CTLR 310 operates in the same manner as CTLR 308, except that the D input to FF 30802 is HALFCLK 346 for CTLR 308 and HALFCLKN 348 for CTLR 310.

Figure 7:
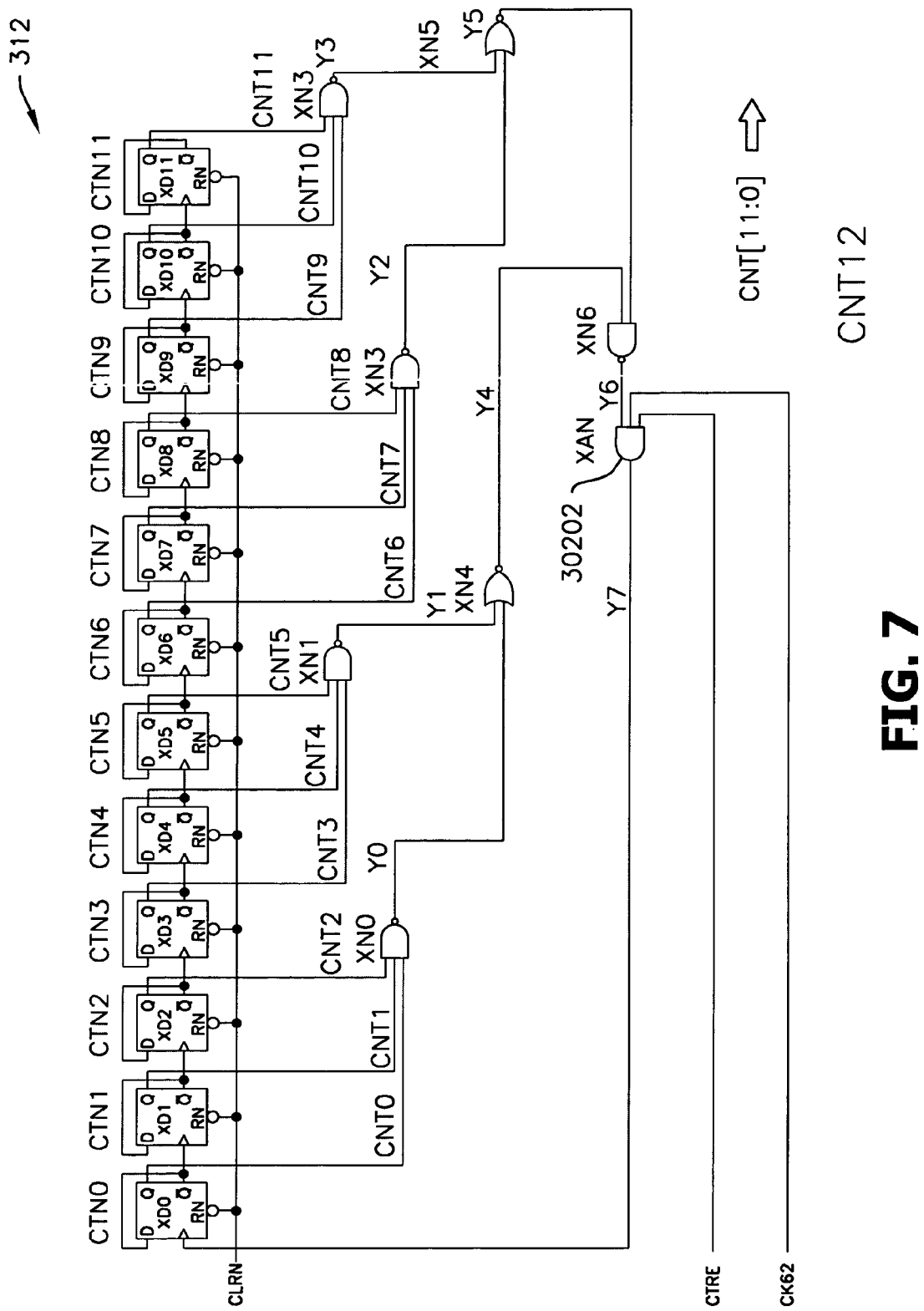
FIG. 7 is a schematic diagram of a CNT12 counter block that may be used in the digital control section of FIG. 2.

The CNT12 counter block 312 shown in FIGS. 2 and 7 is a twelve bit up counter clocked by CK62 when counter enable input CTRE and counter reset CLRN from CTLR 308 are high. As may be ascertained from FIG. 7, the count stops at 0FFFh when the Q outputs of all the flip-flops in FIG. 7 are high, the outputs of all four 3-input NAND gates (lines Y0, Y1, Y2, and Y3) are low, and the outputs of the 2-input NOR gates (lines Y4 and Y5) are high, thereby causing line Y6 at the input of AND gate 30202 to go low. With one of its inputs low, AND gate 30202 can not continue to propagate clock signal CK62 through to line Y7 back to the left side of the chain of FF's. This action prevents the counter from rolling over (wrapping around) from a maximum count to the minimum count, where such a large value change may result in a large frequency changes for the controlled VCO due to a suddenly different count of CK62 ticks per CK33 period. CNT12 314 is identical in design and operation to CNT312. While the illustrated counter is an up-only counter, if it were instead a down-counter and TARG were instead a desired count-down result, then similar provisions might be included for preventing an underflow wrap to below all zeroes. Other count capping ranges besides between all ones and all zeroes, and with wrap around prevention, may be provided for if useful in alternate control loop designs.

Referring back to FIG. 2, the output buses of counters CNT12 (312) and CNT12 (314) are connected as inputs to MUX 316. MUX 316 selects the output of CNT12 (312) if output signal, HALFCLK 346 is a logic high, otherwise MUX 316 selects the output of CNT12 (314) for presentation to GEQ comparator 318. This has the effect of providing the count at the output of MUX 316 from the first edge (rising or falling) detected by HALFCLK 306 until line GOOD 344 goes low. The output from MUX 316, lines Q[11:0], are compared by logic block GEQ12 318 to the TARG[11:0] input. GEQ12 (318) indicates whether the selected counter output is greater than or equal to (GEQ) or equal to (EQ) or is smaller (no express signal) than the target frequency value, TARG[11:0]. The result of the comparison is used in DCTRL 320 to adjust the QDIN[4:0] word to increase or decrease or leave unchanged the control voltage of the ring oscillator in the analog section of QSO.

In one embodiment, prior to sleep mode, at least one of the main controller and minicontroller has control over the START line and shortly after RESET goes low, the controlling logic forces START high for at least 16 consecutive of the C33K clock thereby causing the above recalibration to be performed over the first sixteen periods of the C33K clock after line RESET goes high so that QDIN can be then incremented either way by as many as 16 steps off the PRESET value if needed. Other durations of continuous recalibration may of course be used as appropriate.

Figure 8:
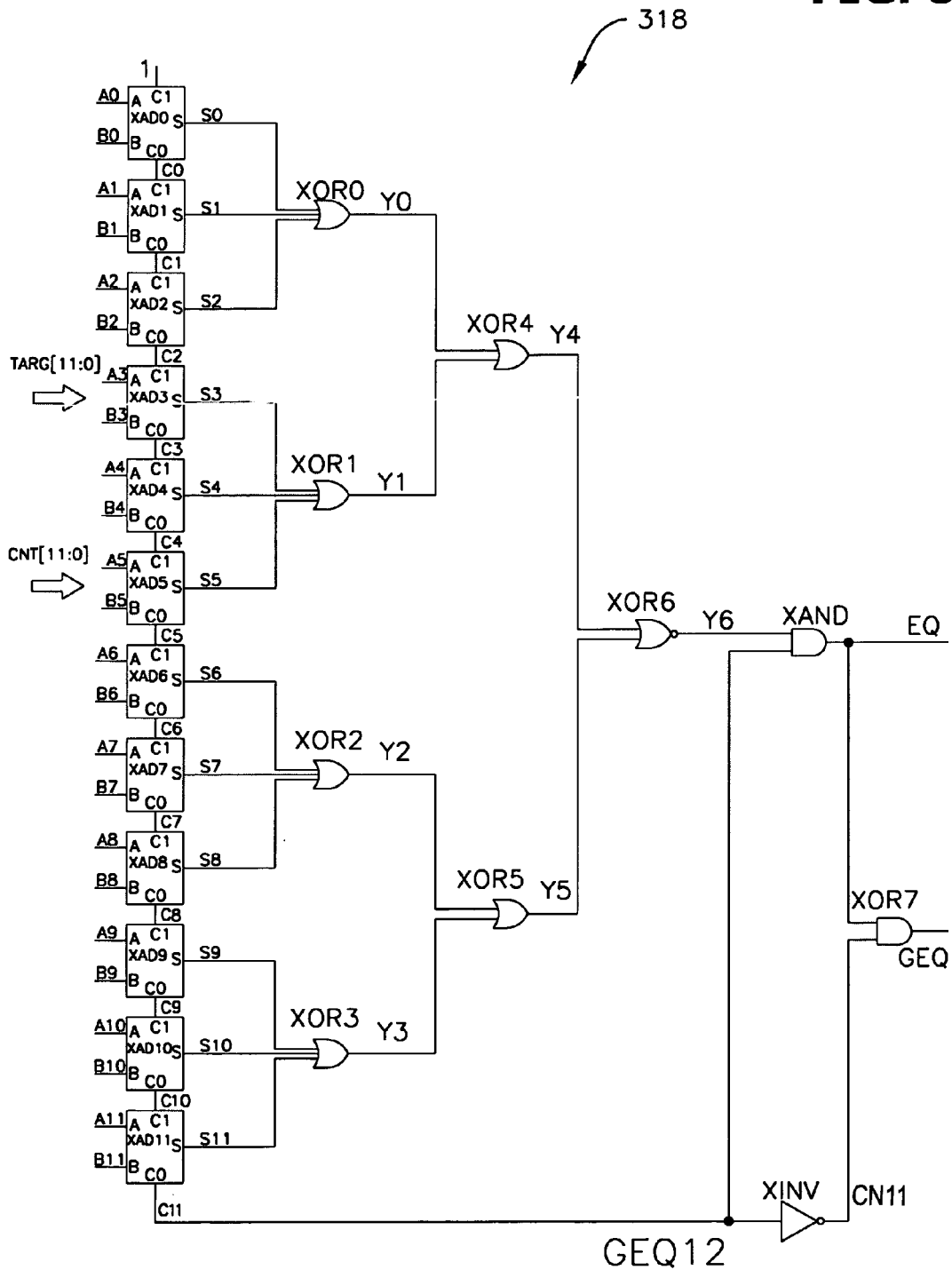
FIG. 8 is a schematic diagram of a GEQ12 digital comparison logic block that may be used in the digital control section of FIG. 2.

FIG. 8 shows a detailed schematic for logic block GEQ12 (318). The GEQ12 block, 318 performs a bit-wise comparison of two 12-bit digital values. Each front-end adder (XAD0 to XAD11) has three inputs, A, B, and CI. CI is the carry bit from the previous adder (hardwired to 1 for the LSB adder, XAD0). Each adder has two outputs, the sum output SO and the carry output CO. Sum and carry outputs are determined according to the rules shown in the following Table 1:

TABLE 1

| In | | | Out | |
|---|---|---|---|---|
| A | B | CI | SO | CO |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

If the input strings TARG[11:0] and CNT(A or B)[11:0] are the same, output line EQ will be set high, otherwise it is set low. If TARG[11:0] is either equal to or larger than CNT[11:0], the output signal GEQ will be set high. If TARG[11:0] is less than CNT[11:0], signals EQ and GEQ are both set low.

Figure 9A:
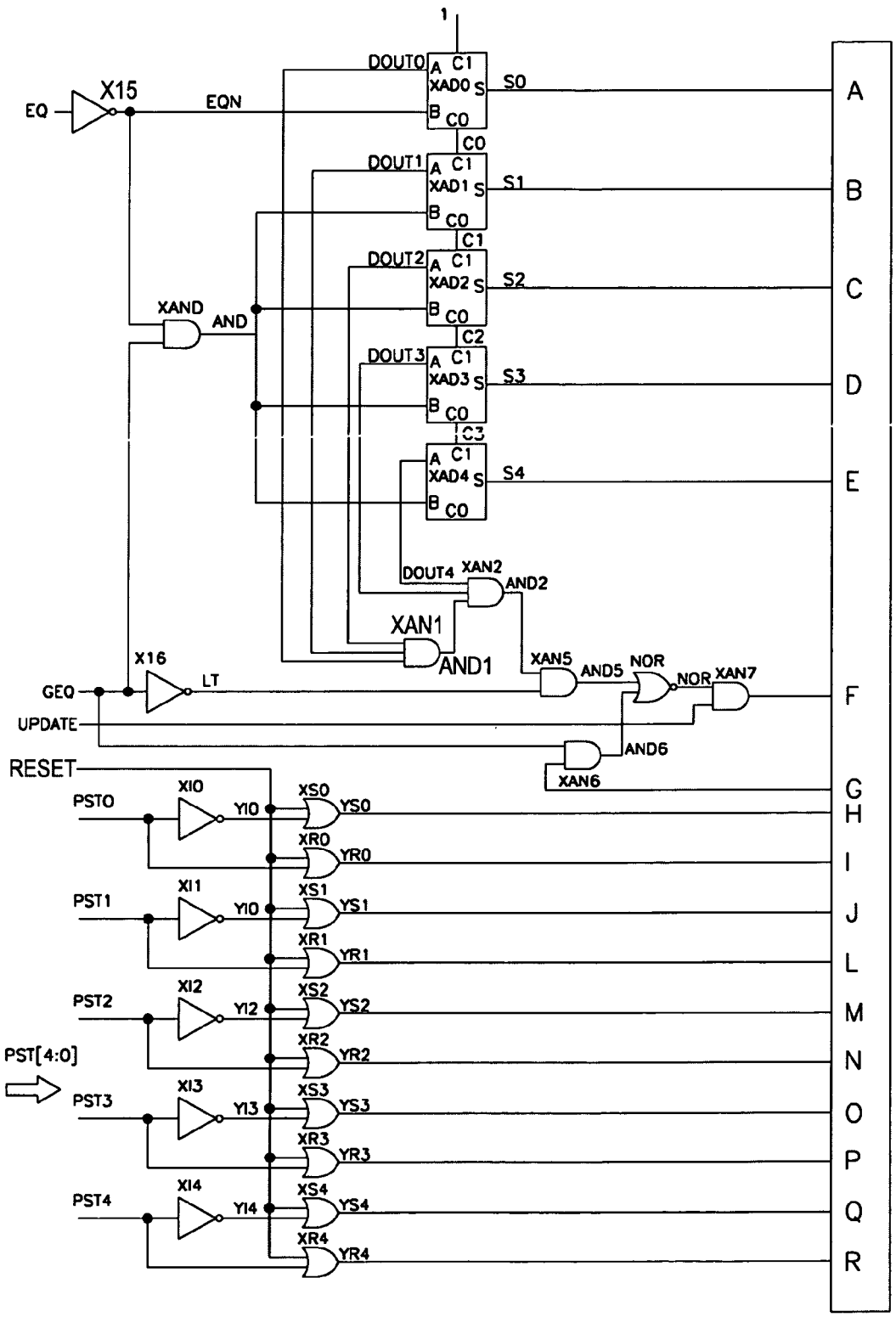
FIG. 9 is a schematic diagram of a data-controlling, DCTRL block that may be used in the digital control section of FIG. 2 for updating and storing the QDIN control word.
Figure 9B:
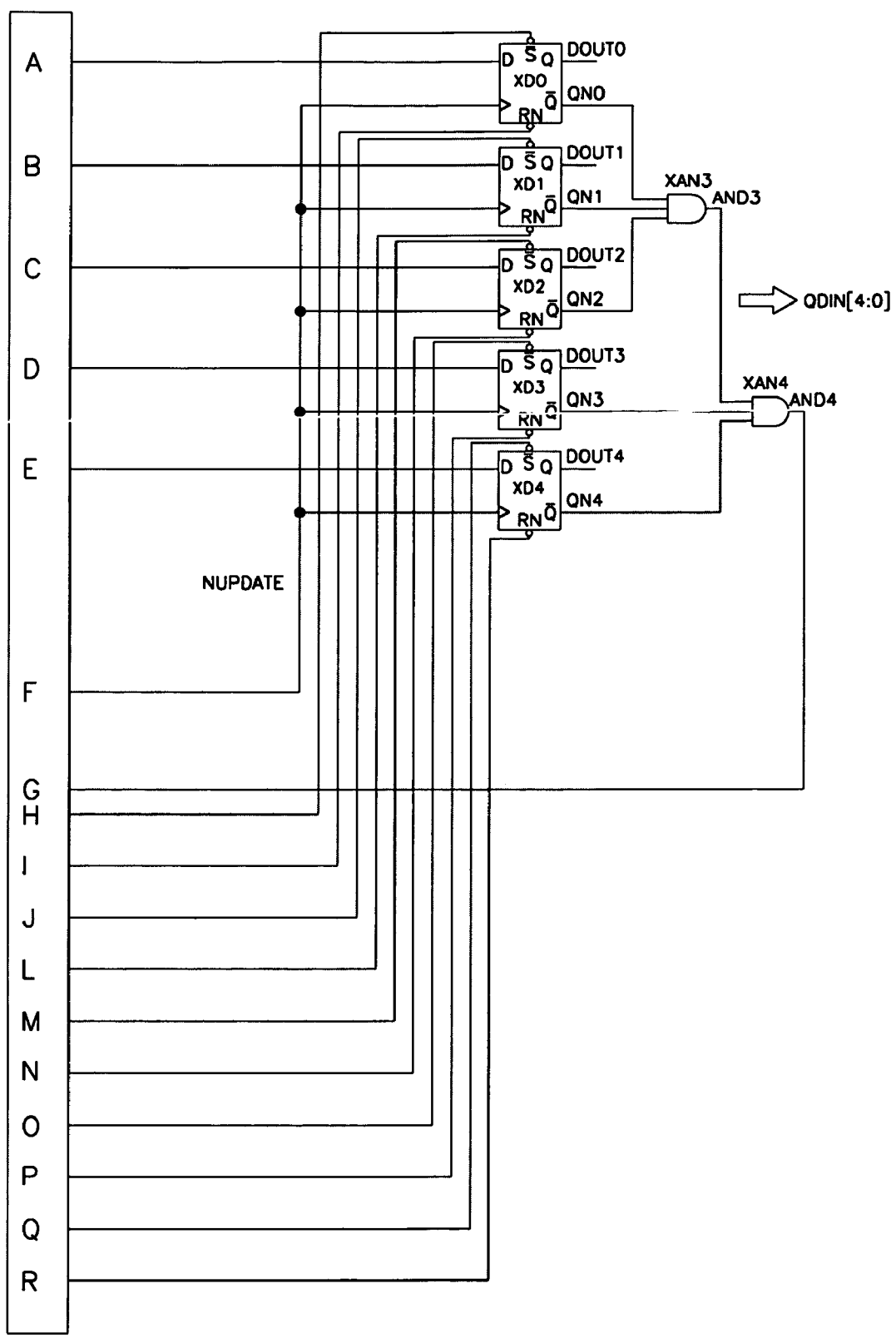

FIG. 9 shows a detailed schematic for one embodiment of the DCTRL logic block 320. It includes a digital adder section and a memory section (flip flops), where the memory section feeds back to the adder and the adder can either increment, decrement or leave unchanged the current QDIN output word. Additionally, a 5-bit calibration pre-set value PST(4:0) can be loaded into the memory section upon emergence from RESET (as shown) and/or prior to entering a sleep mode (not shown, but can OR in with the RESET signal) so that the QSO does not start up from a random value each time sleep is initiated and an LPTC later issues an alert signal (QSO start signal). If the target versus current count comparison provides only the EQ input from GEQ12 (318) being set high, no change is made to the QDIN[4:0] output word. If GEQ is high, QDIN[4:0] is decremented. If GEQ and EQ are both low, QDIN[4:0] is incremented to thereby bring the frequency of the analog section of the QSO operation towards the desired Target value. While a control loop with single stepped, increment, decrement or leave-unchanged controls has been shown, other control loops with better resolution may be used if desired. For example, a digital subtractor (not shown) may be used to determine the difference between a desired TARGet count and the actual count of C62K ticks filling a reference clock period or subperiod. The difference may then be used to adjust the current QDIN[4:0] output word by more than one bit at a time if appropriate. Choice of specific control loop will be application dependent and should consider the speed at which environmental factors may alter the frequency of the VCO.

Figure 14:
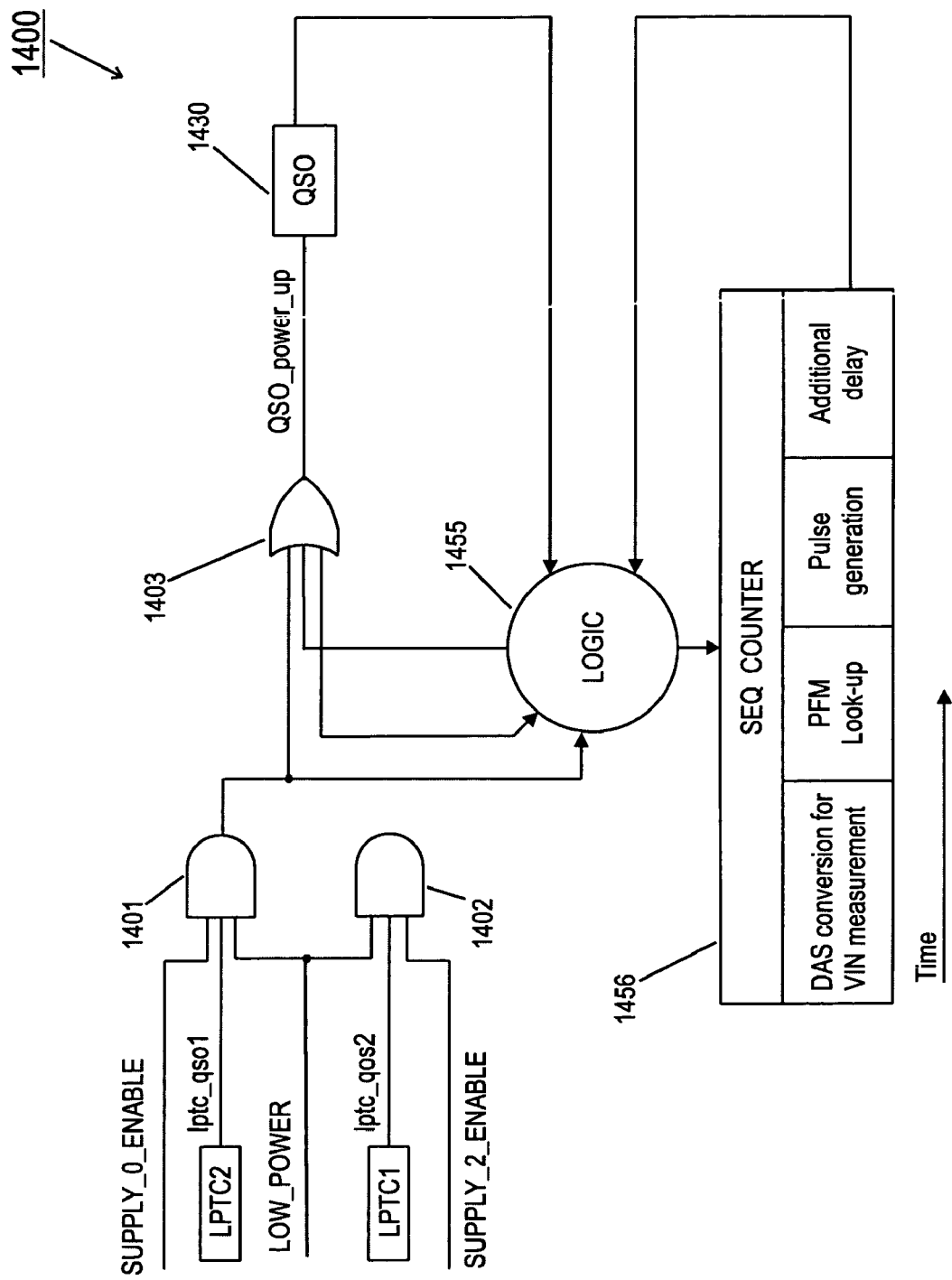
FIG. 14 is a schematic diagram of a logic interface circuit that may be provided between a plurality of LPTC's and the quick start oscillator (QSO) for programmably selecting which LPTC's will have alert capability and for keeping the QSO running independently of LPTC states.

Referring to FIG. 14, a logic diagram for one embodiment 1400 is shown where the awakened QSO 1430 starts up a sequential state machine 1456. The QSO driven counter of the sequential state machine 1456 counts its corresponding logic through four states. The first state consumes time for allowing a sequential analog to digital conversion process (e.g., 1325 of FIG. 13) to take place so that an external input factor (e.g., Vbatt) can be measured. In the second state (PFM lookup) the result of the A/D conversion is applied to a predefined lookup table and corresponding control values (e.g., Ts and Tp) are obtained. In the third state (Pulse generation), the state machine uses the corresponding control values to actuate a response means (e.g., one shot pulsed repowering of a supply capacitor). In the fourth state (Additional delay), the state machine performs post actuation confirmation tasks or simply waits for actuation to settle or selectively extends the on-time of the QSO so that self calibration will be forced to happen within the QSO control loop. At the end of the fourth state, the state machine breaks open the oscillation loop of the VCO (within the QSO) and thereby puts itself to sleep again. The illustrated embodiment shows two LPTC's for triggering the QSO to awaken and two registered enable signals (Supply_X Enable) for selectively determining which LPTC's are enabled for next awakening the QSO. The control logic 1455 includes means for determining which enabled LPTC (which of gates AND 1401 and 1402) issued the awakening signal (alert signal) and for responsively picking a preselected, sequential state algorithm or other algorithm for quickly responding to the alerted condition.

Referring to the UTILTY 1 code below, a calibration method for use with the disclosed, multi-LPTC system is disclosed with C-style code as follows:

UTILTY 1

```
////////////////////////////////////////////////////////////////
//////
//
// Function Prototype: void PwrCalibrateLPTC (U8 powerSupply);
//
// Description: void PwrCalibrateLPTC (U8 powerSupply)
//                       is used to calibrate
//                       LPTC circuit for Supplies 0 and 2.
//
// Arguments:
//          U8 powerSupply: (0,2) external CV Buck supplies,
//
// Return value:
//          None
//
////////////////////////////////////////////////////////////////
//////
```

UTILTY 1 -continued

```
// Function Revision History:
//
// VER:        DATE:       AUTHOR:        REASON:
////////////////////////////////////////////////////////////////
//////
//
// FS1610       7/8/04       PG        Initial release.
//
////////////////////////////////////////////////////////////////
//////
void PwrCalibrateLPTC (U8 powerSupply)
{
    U8 channel, i;
    U16 readVal;
    U16 *SuppPtr;
    i= powerSupply >> 1;
    // Enable analog circuit for this LPTC circuit
    *SysAnalogCtl |= (1<<i);
    // Enable calibration mode
    REG_CAL_TEST_CTL |= (1<<i);
    // DAC_OFFSET = 314 --> 800mV/2.54
    // DAS_lsb=1.34 DAC_lsb= 2.54 --> 2.54/1.34=1.8955 ~2.00
        //(assume ratio of two-to-one )
    if (powerSupply==0)
    {
        SuppPtr=RegSup0LpDbLo;
        channel= ADC_LPTC0;
    }
    else   // Must be supply 2
    {
        SuppPtr=RegSup2LpDbLo;
        channel= ADC_LPTC1;
    }
    // Write target voltage to RegSup[0 or 2]LpDbLo;
    *SuppPtr= (supplyVtarStby[i]>>1) - LPTC_DAC_OFFSET;
    // read the voltage
    readVal = ReadVoltage(channel);
    // check if readval is within acceptable range
    if (abs(readVal- supplyVtarStby[i]) <=
    LPTC_CALIBRATION_TARGET_COUNT)
    {
        // LPTC is calibrated:
        // Disable calibration for this LPTC
        REG_CAL_TEST_CTL &= ~(1<<i);
        // Disable analog circuit
        *SysAnalogCtl &= ~(1<<i) ;
        return;
    }
    else
    {
        // Do a coarse adjustment
        if (readVal> supplyVtarStby[i])
        {
            // Adjust for Over, seldom (glitches) or never
            happens
            *SuppPtr -= (readVal-supplyVtarStby[i]) >> 1;
        }
        else
        {
            // Adjust for Under. This condition happens more often
            *SuppPtr += (readVal-supplyVtarStby[i]) >> 1;
        }
    }
    // And do the fine tunning here
    while (TRUE)
    {
        // read the voltage
        readVal = ReadVoltage(channel);
        if (abs(readVal- supplyVtarStby[i]) <=
    LPTC_CALIBRATION_TARGET_COUNT)
        {
            // LPTC calibrated:
            // Disable calibration for this LPTC
            REG_CAL_TEST_CTL &= ~(1<<i);
            // Disable analog circuit for this LPTC
            *SysAnalogCtl &= ~(1<<i);
            return;
```

-continued

UTILTY 1

```
        }
        else
        {
            if (readVal > supplyVtarStby[i])
                *SuppPtr -=1;
            else
                *SuppPtr +=1;
        }
    }
} //End of PwrCalibrateLPTC( )
```

The present disclosure is not limited to any specific uses for the LPTC alert signals and/or for the QSO clock to the exclusion of others. Use of either or both the LPTC(s) and QSO may be had in a variety of low power systems. In one embodiment relating to the cited Ser. No. 11/030,688, the QSO clock is used to clock a so-called REG minicontroller so that the latter may run a regulation algorithm, such as the PFM technique disclosed in Ser. No. 11/030,688. Use of the combination of the LPTC and QSO in such an environment eliminates need for the taking of periodic analog measurements followed by periodic and power-consuming analog-to-digital conversions (ADC). Upon being awakened by a given LPTC, the REG minicontroller knows from the identification of the LPTC that a given threshold voltage has recently been crossed. The REG minicontroller does not exactly know what the current battery voltage (Vbatt in FIG. 13) is so it should take one ADC-based measurement of that (using ADC 1325 of FIG. 13) and then it can quickly look up or calculate the appropriate Tp and Ts values for properly reenergizing the discharged capacitor. This arrangement allows the system to stay in low power mode until a given vital voltage reaches a predetermined minimum and then to wake up briefly merely to replenish that one vital voltage without consuming massive amounts of power. In this way, the intermittent amount of power needed to calculate the correct response and effect an appropriate regulation response is amortized across the entire sleep period by waking up only when needed rather than according to a situation-independent wake-up schedule.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of examples of a further modification in accordance with the disclosure, the reference voltage supplied to the LPTC could be provided by a band gap voltage source or other accurate means for developing a voltage. A monitored condition can be deemed alert-worthy by a unidirectional crossing of a monitored physical aspect above rather than below a predefined threshold or by a departure from a predefined range. Appropriately oriented analog comparators may be used for such detections. The monitored condition is not limited to voltage and can include electrical current magnitude, temperature, pressure, power consumption or other appropriate attributes within a given environment. The relatively high target frequency of the QSO and relatively low reference frequency of the CK33 reference can be selected for the needs of the given system that is to be clocked by the QSO. Generally the QSO frequency will be about 10 times or a greater multiple of the low reference frequency. While only one main controller 1350 is provided in FIG. 13, systems in accordance with the disclosure may include multiple further logic units (intelligent units) that are kept asleep while the minicontroller 1355 awakens to respond briefly to exigent circumstances. More or less number of bits for expressing the resolution of a given target voltage or target frequency may be used as appropriate. Rather than just one QSO, a system may have a plurality of such QSO's awakened by different subsets of LPTC's and shifting into different operating frequencies as may be desirable in different situations. Further, the QSO clock may be provided directly to the main controller 1350 or its equivalent(s) when PLL accuracy for the main clock is not needed.

By way of more examples of modifications in accordance with the disclosure, the QSO is not limited to containing a digital ring oscillator. Other voltage controlled oscillator designs may be used where means are provided for effectively increasing the loop gain to above positive one so as to induce oscillations and where means are provided for controlling the frequency with a control voltage. The key points of one set of embodiments are that the VCO is essentially ready to oscillate at or substantially near to the target frequency but for the switching of the loop gain and for the fine tuning of the control voltage to the magnitude that corresponds to the target frequency.

By way of a further example, it is understood that the configuring of the minicontroller 1355 (FIG. 13) to carry out appropriate responses to awakenings from different LPTC's (1310a, 1310b, etc.) can include use of an external computer to program the minicontroller prior to the entering of sleep mode. A computer-readable medium or another form of a software product or machine-instructing means (including but not limited to, a hard disk, a flash memory stick, a downloading of manufactured instructing signals over a network and/or like software products) may therefore be used for instructing an instructable machine to define the threshold values used by respective LPTC's, and/or to define the respective target frequency to be attained by a given QSO in response to an alert from a given LPTC, and/or to define the respective response operation to be carried out by a QSO-awakened intelligent means (e.g., 1355) in response to being awakened by a started up one of one or more QSO's. As such, it is within the scope of the disclosure to have an instructable machine carry out, and/to provide a software product adapted for causing an instructable machine to carry out such programmings of LPTC's and minicontrollers.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method of monitoring one or more conditions of a system that is temporarily in a relatively low-powered mode as compared to a more normal, higher powered mode where the monitoring is to be followed by intelligent response to one or more detected changes of one or more of the monitored conditions, the method comprising:
    (a) using a set of one or more, low-powered analog to monitor said one or more conditions for respectively detecting changes of condition that are predefined as alert-worthy changes, wherein one or more of said alert-worthy changes of condition are detected by comparing a respectively monitored analog signal relative to a correspondingly supplied reference signal while said system is in its more normal, higher powered mode rather than the relatively low-powered mode, adjusting at least one of said reference signals as respectively supplied to one or more given ones of the low-powered analog comparators, where said adjusting counter-compensates for one or more errors in signaling pathways of each respective one of the given low-powered analog comparators where said counter-compensated-for errors include at least one of a comparator offset error and a DAC offset error;
    (b) in response to one of said analog comparators detecting an alert-worthy change of condition, quickly starting up an oscillator within one millisecond or less of said detecting of the alert-worthy change of condition; and
    (c) using the quickly started up oscillator to clock a first logical responding unit and to thereby enable the first logical responding unit to respond to the detecting of an alert-worthy change of condition by one or more of said low-powered analog comparators.

2. The method of claim 1 wherein:
    (a.1) one or more of said alert-worthy changes of condition is defined as a unidirectional crossing of the respectively monitored condition either above or below a predefined threshold.

3. The method of claim 2 and further comprising:
    (a.2) programmably defining said predefined threshold prior to commencement of said monitoring and while said system is not in its relatively low-powered mode.

4. The method of claim 1 wherein:
    (a.1) one or more of said alert-worthy changes of condition is defined as a departure of the monitored condition from a predefined containment range.

5. The method of claim 4 and further comprising:
    (a.2) programmably defining said predefined containment range prior to commencement of said monitoring and while said system is not in its relatively low-powered mode.

6. The method of claim 1 and further comprising:
    (d) reducing power draw of the first logical responding unit prior to commencement of said low power monitoring by stopping supply of clock signals to the first logical responding unit while leaving the first logical responding unit in a state where it will be awakened immediately or within a few number of start up ticks of the quick start oscillator following start up of said quick start oscillator, where said few number is less than or equal to 100.

7. The method of claim 6 wherein said few number is 8 or less.

8. The method of claim 6 wherein said few number is in the range 2 to 100 inclusive.

9. The method of claim 6 wherein said system includes one or more further logical units in addition to said first logical responding unit and said method includes:
    (e) reducing power draw of the one or more further logical units prior to commencement of said low power monitoring by stopping supply of clock signals to said further logical units while leaving the one or more further logical responding units in respective states where they can be awakened by start of their respectively stopped clock signals; and
    (f) keeping the one or more further logical units in their respective unclocked, asleep states while the first logical responding unit awakens to respond to the detecting of an alert-worthy change of condition by one or more of said low-powered analog comparators.

10. The method of claim 1 and further comprising:
    (c.1) upon using the started up oscillator to clock the first logical responding unit, further causing the first logical responding unit to determine which, if any, low-powered analog comparator signaled the alert-worthy change of condition that led to the start up of said oscillator.

11. The method of claim 1 wherein the quickly started oscillator is a variable frequency oscillator, and the method further comprises:
    (b.1) comparing the output frequency of the started variable frequency oscillator to a predefined target value, and if the frequency comparison indicates an off target condition, adjusting the output frequency of the started variable frequency oscillator towards convergence with the target value.

12. The method of claim 11 wherein the target value represents a frequency which is at least 10 times greater than a reference frequency of a supplied reference clock signal and the target value is programmably set.

13. The method of claim 11 and further comprising:
    (b.2) recording data representing the state of the variable frequency oscillator after said adjusting of the output frequency so that the variable frequency oscillator can be restarted in a state defined by the recorded data when restarting in response to one of said analog comparators detecting a next alert-worthy change of condition.

14. The method of claim 1 wherein the quickly started oscillator is a variable frequency oscillator, and the method further comprises:
    (c.1) preventing the quickly started up oscillator from clocking the first logical responding unit until the quickly started up oscillator has a frequency below a predefined maximum frequency.

15. The method of claim 14 and further comprising:
    (c.2) starting the quickly started up oscillator in a state where the output frequency of the started up oscillator can be greater than said predefined maximum frequency.

16. A system having a relatively low-powered, sleep mode and one or more system vital conditions that may require monitoring during the sleep mode to assure that the system can be awakened without loss of operational states developed prior to entry into the low-powered, said system also having a higher powered mode and comprising:
- (a) one or more, low-powered analog comparators coupled to monitor said one or more system vital conditions for respectively pre-defined, alert-worthy changes of condition, wherein at least a given one of said low-powered analog comparators is coupled to receive a respective monitored analog signal and a corresponding reference signal against which the respective monitored analog signal is to be compared within the given analog comparator, and further comprising a digital-to-analog converter (DAC) operatively coupled to produce said corresponding reference signal, a DAC-controlling memory operatively coupled to supply a digital input word to said DAC for thereby producing the corresponding reference signal, and an analog-to-digital converter (ADC) operatively coupled to said given analog comparator for measuring an output of the given analog comparator when a given digital input word is supplied to said DAC for thereby producing the corresponding reference signal;
- (b) one or more quick-start oscillators, each operatively coupled to one or more of said analog comparators for quickly starting up within one millisecond or less in response to a detecting of an alert-worthy change of condition by a corresponding one of said analog comparators; and
- (c) a first logic unit that can be started up out of a respective first low power state by activation of at least one of said quick-start oscillators, the clocking of the first logic unit enabling the first logic unit to respond to the detecting of an alert-worthy change of condition by one or more of said low-powered analog comparators.

17. The system of claim 16 and further comprising:
- (a.5) input shorting means operatively coupled to the given analog comparator for temporarily shorting the ADC-measured output of the given analog comparator to an input thereof so that the given analog comparator behaves substantially as a unity gain amplifier.

18. The system of claim 16 and further comprising:
- (a.5) a multiplexer operatively coupled to the analog-to-digital converter (ADC) so that the ADC can be used to measure a supply voltage and relay the measurement data to the first logic unit.

19. The system of claim 18 wherein the ADC is operatively coupled to receive a clock signal output by at least one of the awakened quick-start oscillators.

20. The system of claim 16 wherein:
- (a.1) at least a given one of said low-powered analog comparators is configured to more strongly react to a first unidirectional crossing of a respectively monitored condition past a predefined threshold than to react to an opposed second unidirectional crossing of the respectively monitored condition past the predefined threshold thereby causing the first unidirectional crossing to function as an alert-worthy change of condition.

21. The system of claim 16 and further comprising:
- (d) power down means for placing one or more of the low-powered analog comparators in respective power down modes.

22. The system of claim 16 and further comprising:
- (d) a second logic unit that is not awakened out of a respective second low power state by activation of at least one of said quick-start oscillators that starts up the first logic unit out of its respective first low power state.

23. The system of claim 16 and further comprising:
- (d) alert source identifying logic, operatively coupled to the first logic unit for allowing the first logic unit to determine which, if any, of the low-powered analog comparators signaled an alert-worthy change of condition that led to the start up of at least one of said quick-start oscillators and consequential start up of the first logic unit.

24. The system of claim 16 wherein at least a given one quickly started oscillator (QSO) includes a variable frequency oscillator, and the given QSO further comprises:
- (b.1) a frequency calibrator structured to compare the output frequency of the variable frequency oscillator to a predefined target value, and if the frequency comparison indicates an off target condition, to adjust the output frequency of the variable frequency oscillator towards convergence with the target value.

25. The system of claim 24 wherein the given QSO further comprises:
- (b.2) adjustment memory for storing data representing a frequency adjustment earlier made by the frequency calibrator, the adjustment memory being operatively coupled to the variable frequency oscillator such that when the given QSO is restarted or is further calibrated, results of the earlier made frequency adjustment can be used for making a next frequency adjustment.

26. The system of claim 24 and further comprising:
- (d) a low frequency reference clock operatively coupled to the frequency calibrator of the given QSO for allowing the frequency calibrator to compare the output frequency of the variable frequency oscillator against a reference frequency of a reference clock signal produced by the low frequency reference clock, wherein the target value represents a frequency which is at least 10 times greater than said reference frequency of the low frequency reference clock.

27. The system of claim 26 and further comprising:
- (e) target storage for storing the target value as a programmably set data signal.

28. The system of claim 27 and further comprising:
- (f) preset storage for storing preset data representing an initial state of the variable frequency oscillator from which the variable frequency oscillator is to be calibrated to attain a target frequency represented by the target value.

29. The system of claim 16 and further comprising:
- (a.1) one or more programmable storage units for programmably defining said alert-worthy changes of condition to be detected by respective ones of said low-powered analog comparators.

30. The system of claim 29 wherein:
- (a.2) said one or more programmable storage units are operatively coupled to an error compensating means that adjusts the programmable definition of the alert-worthy change of condition to counter-compensate for an offset error and/or other error associated with one or both of the analog comparator which monitors the respectively monitored condition and a digital-to-analog converter (DAC) which converts into an analog counterpart, the programmable definition of the alert-worthy change of condition.

* * * * *